US007765091B2

(12) United States Patent
Lee et al.

(10) Patent No.: US 7,765,091 B2
(45) Date of Patent: Jul. 27, 2010

(54) METHOD, APPARATUS AND SYSTEM FOR RESERVOIR SIMULATION USING A MULTI-SCALE FINITE VOLUME METHOD INCLUDING BLACK OIL MODELING

(75) Inventors: Seong H. Lee, Emeryville, CA (US); Christian Wolfsteiner, Oakland, CA (US); Hamdi A. Tchelepi, San Mateo, CA (US); Patrick Jenny, Zurich (CH); Ivan Fabrizio Lunati, Zurich (CH)

(73) Assignees: Chevron U.S.A Inc., San Ramon, CA (US); Schlumberger Technology Corporation, Houston, TX (US); ETH Zurich, Zurich (CH)

( * ) Notice: Subject to any disclaimer, the term of this patent is extended or adjusted under 35 U.S.C. 154(b) by 0 days.

(21) Appl. No.: 11/763,109

(22) Filed: Jun. 14, 2007

(65) Prior Publication Data

US 2008/0208539 A1    Aug. 28, 2008

Related U.S. Application Data

(60) Provisional application No. 60/814,748, filed on Jun. 18, 2006, provisional application No. 60/814,747, filed on Jun. 18, 2006.

(51) Int. Cl.
*G06G 7/58* (2006.01)
(52) U.S. Cl. ........................................... 703/10
(58) Field of Classification Search ............ 703/10
See application file for complete search history.

(56) References Cited

U.S. PATENT DOCUMENTS 6,106,561 A * 8/2000 Farmer .................... 703/10

(Continued)

FOREIGN PATENT DOCUMENTS

WO      WO 99/52048       10/1999

(Continued)

OTHER PUBLICATIONS

Ivan Lunati and Patrick Jennya, (Lunati hereinafter), Multiscale Finite-Volume Method for Compressible Multiphase Flow in Porous Media, Available online Feb. 10, 2006, pp. 616-636.*

(Continued)

*Primary Examiner*—Paul L Rodriguez
*Assistant Examiner*—Juan C Ochoa
(74) *Attorney, Agent, or Firm*—Christopher D. Northcutt; Craig R. Vander Ploeg; Richard J. Schulte

(57) ABSTRACT

A multi-scale finite-volume (MSFV) method simulates nonlinear immiscible three-phase compressible flow in the presence of gravity and capillary forces. Consistent with the MSFV framework, flow and transport are treated separately and differently using a fully implicit sequential algorithm. The pressure field is solved using an operator splitting algorithm. The general solution of the pressure is decomposed into an elliptic part, a buoyancy/capillary force dominant part, and an inhomogeneous part with source/sink and accumulation. A MSFV method is used to compute the basis functions of the elliptic component, capturing long range interactions in the pressure field. Direct construction of the velocity field and solution of the transport problem on the primal coarse grid provides flexibility in accommodating physical mechanisms. A MSFV method computes an approximate pressure field, including a solution of a course-scale pressure equation; constructs fine-scale fluxes; and computes a phase-transport equation.

20 Claims, 13 Drawing Sheets

U.S. PATENT DOCUMENTS

| | | |
|---|---|---|
| 6,266,619 B1 | 7/2001 | Thomas et al. |
| 6,631,202 B2 | 10/2003 | Hale |
| 2002/0013687 A1 | 1/2002 | Ortoleva |
| 2003/0028325 A1 | 2/2003 | Roggero et al. |
| 2003/0078733 A1* | 4/2003 | Stone ........................ 702/13 |

FOREIGN PATENT DOCUMENTS

| | | |
|---|---|---|
| WO | WO 99/57418 | 11/1999 |
| WO | WO 00/79423 A1 | 12/2000 |
| WO | WO 01/06091 A1 | 1/2001 |
| WO | WO 01/27755 A1 | 4/2001 |
| WO | WO 01/27858 A1 | 4/2001 |
| WO | WO 02/06857 A1 | 1/2002 |

OTHER PUBLICATIONS

Aarnes et al, Mixed Multiscale Finite Elements and Streamline Methods for Reservoir Simulation of Large Geomodels, published Mar. 2005, Advances in Water Resources, vol. 28, Issue 3, p. 257-271.*

Bratvedt et al.; Streamline Computation for Porous Media Flow Including Gravity; 1996; Transp Porous Media, 25; pp. 63-78.*

Jenny et al., (Jenny hereinafter), Adaptive Multiscale Finite-Volume Method for Multi-Phase Flow and Transport in Porous Media, 2004, Multiscale Modeling & Simulation, 3 (1), pp. 50-64.*

Efendiev, Y.R. and Wu, X.H., Multiscale Finite Element for Problems With Highly Oscillatory Coefficients, *Numerische Mathematik*, 90, 459-486, 2002.

Chen, Z. and Hou, T.Y , A Mixed Multiscale Finite Element Method for Elliptic Problems With Oscillating Coefficients, *Mathematics of Computation*, 72, No. 242, 541-576, Jun. 2002.

Lunati, Ivan and Patrick Jennya, (Luriati hereinafter), Multiscale Finite-Volume Method for Compressible Multiphase Flow in Porous Media, *Journal of Computational Physics*, 216, 616-636, 2006.

Busing, et al, Efficient Newton-Raphson and Implicit Euler Methods for Solving the HNC Equation, Molecular Physics—An International Journal in the Field of Chemical Physics, May 1992, pp. 89-101, vol. 76, Issue 1, DOI 10.1080/00268979200101181, Taylor & Francis, Philadelphia, Pennsylvania.

Durlofsky, A Triangle Based Mixed Finite Element-Finite Volume Technique for Modeling Two Phase Flow Through Porous Media, Journal of Computational Physics. 1993, pp. 252-266, vol. 105, Elsevier, Inc., Atlanta, Georgia.

Fujiwara, et al., The Newton Raphson Method Accelerated by Using a Line Search-Comparison Between Energy Functional and Residual Minimization, IEEE Transactions on Magnetics, May 2005, pp. 1724-1727, vol. 41, No. 5, DOI 10.1109/TMAG.2005.846048. Institute of Electrical and Electronics Engineers, Inc. (IEEE). Piscataway, New Jersey.

Gang, et al., Multi-Parameter Accelerated Modified Newton—Raphson Methods for Rigid-Plastic FE Analysis, Acta Mechanics Solida Sinica, Dec. 2002, pp. 323-331, vol. 15, No. 4, DOI 10.1007/BF02493033. The Chinese Society of Theoretical and Applied Mechanics, Beijing, China.

Oak, et al., Three-Phase Relative Permeability of Brea Sandstone, Journal of Petroleum Technology (JPT). 1990, pp. 1057-1061, Society of Petroleum Engineers (SPE), Houston, Texas.

Salibian-Barrera, et al., Fast and Stable Bootstrap Methods for Robust Estimates, Computing Science and Statistics, 2002, vol. 34, pp. 346-359, Interface Foundation of North America, Inc., Fairfax Station, Virginia.

Tesch, The Newton-Raphson Method and its Application to Fixed Points, Nov. 21, 2005, Center for Hybrid and Embedded Software Systems at the University of California, Berkeley. Berkeley, California.

Chien, M.C.H., Wasserman, M.L.; Yardumian, H.E., and Chung, E.Y., The Use of Vectorization and Parallel Processing for Reservoir Simulation, *Society of Petroleum Engineers* (SPE 16025), 329-341, 1987.

Durlofsky, L.J., Numerical Calculation of Equivalent Grid Block Permeability Tensors for Heterogeneous Porous Media, *Water Resources Research*, 27, 699-708, 1991.

Durlofsky, L.J , Jones, R.C., and Milliken, W.J., A Nonuniform Coarsening Approach for the Scale-up of Displacement Processes in Heterogeneous Porous Media, *Advances in Water Resources*, 20, Nos. 5-6, 335-347, 1997.

Hou, T.Y. and Wu, X.H., A Multiscale Finite Element Method for Elliptic Problems in Composite Materials and Porous Media, *Journal of Computational Physics*. 134, 169-189, 1997.

Lee, S.H., Durlofsky, L.J., Lough, M.F., and Chen, W.H., Finite Difference Simulation of Geologically Complex Reservoirs With Tensor Permeabilities, *SPE Reservoir Evaluation & Engineering*, 567-574, Dec. 1998.

Lee, S.H., Tchelepi, H., and Dechant, L.F., Implementation of a Flux-Continuous Finite Difference Method for Stratigraphic, Hexahedron Grids, *Society of Petroleum Engineers* (SPE 51901). 1-11, 1999.

Wallstrom, T.C., Hou, S., Christie, M.A., Durlofsky, L.J. and Sharp; D.H., Application of a New Two-Phase Upscaling Technique to Realistic Reservoir Cross Sections, *Society of Petroleum Engineers* (SPE 51939), 451-462. 1999.

Arbogast, T., Numerical Subgrid Upscaling of Two-Phase Flow in Porous Media, Technical Report, Texas Institute for Computational and Applied Mathematics. The University of Texas at Austin, 1-15, 1999.

Efendiev, Y.R., Hou, T.Y., and Wu, X.H., Convergence of a Nonconforming Multiscale Finite Element Method, *SIAM Journal of Numerical Analysis*, 37, No. 3, 888-910, 2000.

Arbogast, T. and Bryant, S.L., Numerical Subgrid Upscaling for Waterflood Simulations, *Society of Petroleum Engineers* (SPE 66375), 1-14. 2001.

Christie, M.A. and Blunt, M.J., Tenth SPE Comparative Solution Project: A Comparison of Upscaling Techniques, *Society of Petroleum Engineers* (SPE 66599). 1-13, 2001.

Jenny, P., Wolfsteiner, C., Lee, S.H., and Durlofsky, L.J., Modeling Flow in Geometrically Complex Reservoirs Using Hexahedral Multi-block Grids, *Society of Petroleum Engineers* (SPE 66357). 1-10, 2001.

* cited by examiner

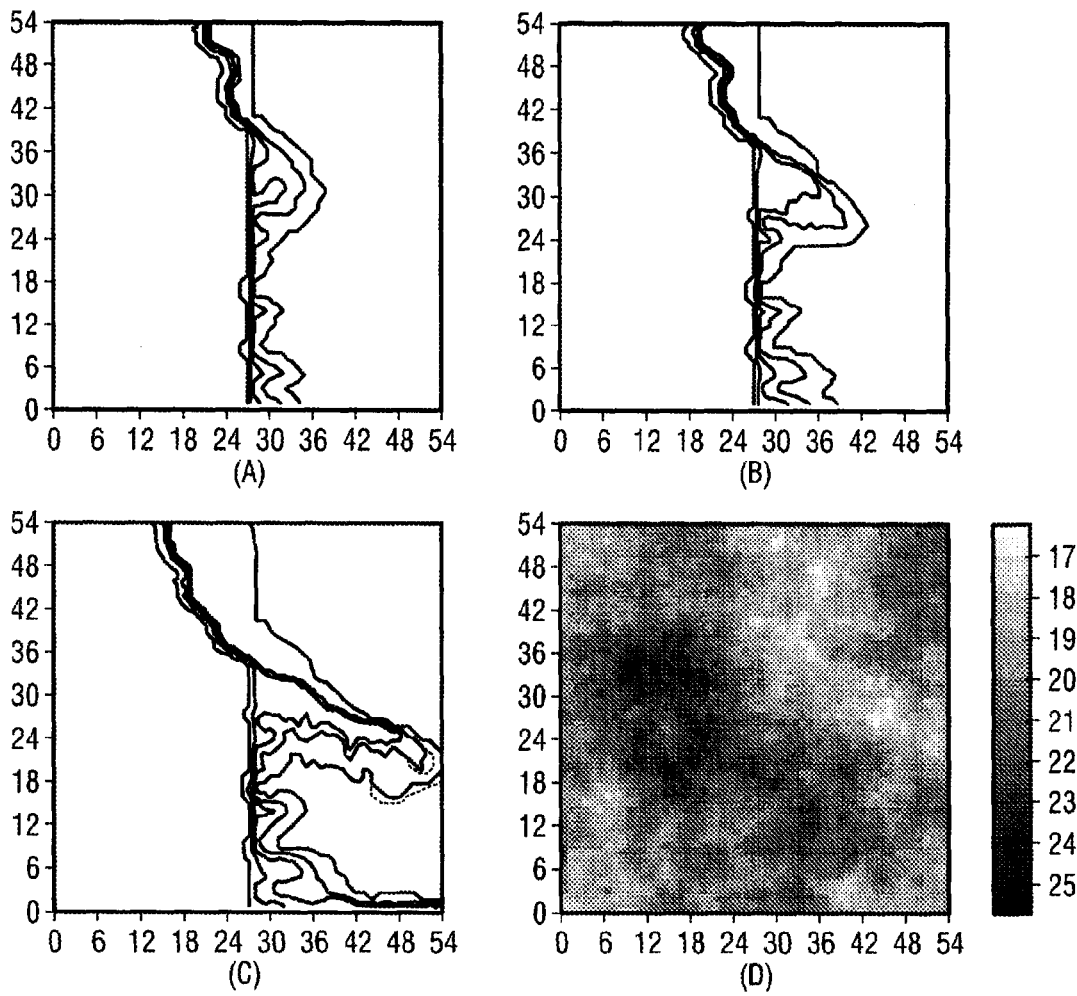
FIG. 14
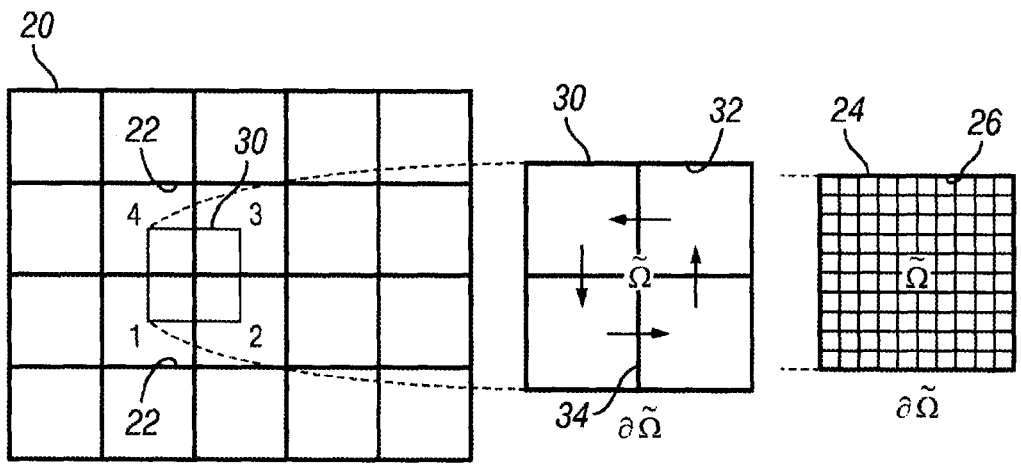
FIG. A1

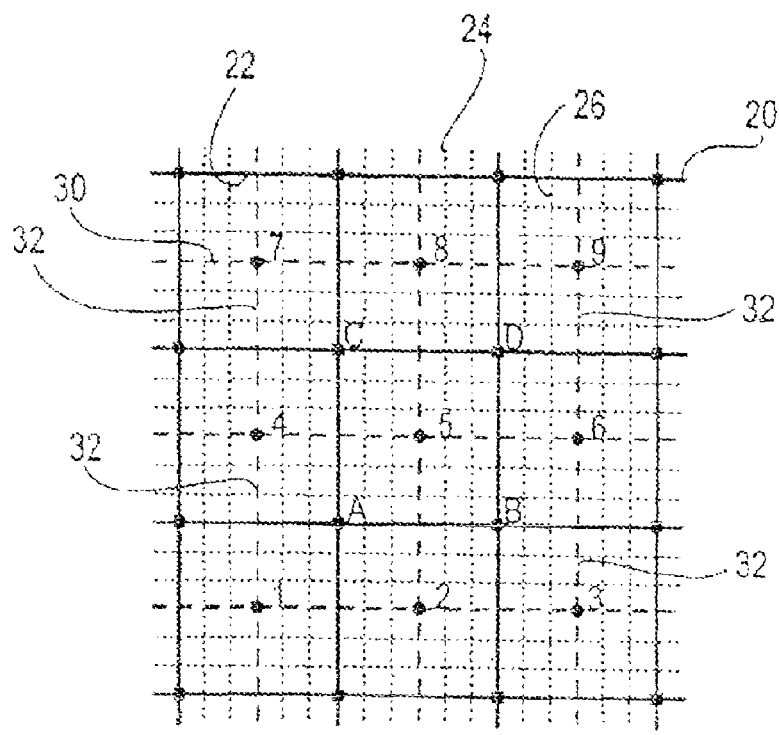
FIG. A2
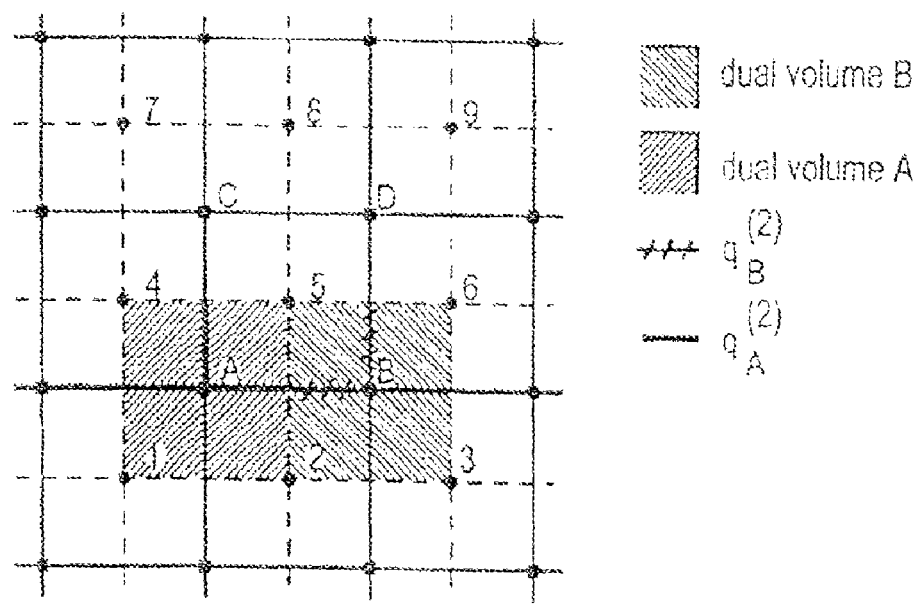
FIG. A3

US 7,765,091 B2

METHOD, APPARATUS AND SYSTEM FOR RESERVOIR SIMULATION USING A MULTI-SCALE FINITE VOLUME METHOD INCLUDING BLACK OIL MODELING

RELATED APPLICATION

This nonprovisional application claims the benefit of provisional U.S. patent application Ser. No. 60/814,748, filed on Jun. 18, 2006, and U.S. Ser. No. 60/814,747, filed on Jun. 18, 2006, which are both hereby incorporated by reference in their entireties.

TECHNICAL FIELD

The present invention relates generally to the simulation of fluid flow in subterranean formations, and more particularly, to reservoir simulations which utilize black oil models and to reservoir simulations which use multi-scale methods.

BACKGROUND OF THE INVENTION

Reservoir simulation is used to predict the flow of fluids in underground reservoir. The fluid flow may include oil, gas and water. Such reservoir forecasting is important in reservoir management and estimating the potential recovery from a reservoir.

Reservoir simulation is well known throughout the oil industry and in the scientific literature. A good primer on the principles behind reservoir simulation is K. Aziz and A. Settari, *Petroleum Reservoir Simulation*, Elsevier Applied Science Publishers, London (1979). Another description of how reservoir simulation is generally performed is described in U.S. Pat. No. 6,052,520 to Watts III et al. These references are hereby incorporated by reference in their entireties.

The following are general steps taken in a conventional reservoir simulation. First a reservoir is selected for which the rock and fluid properties are to be modeled and simulated. The reservoir is modeled and discretized into a plurality of cells. Nonlinear governing equations are constructed for each cell generally in the form of finite difference equations, which are representative of properties of rocks and fluids in the reservoir. Examples of rock properties include porosity, capillary pressure and relative permeability for each phase of fluid (oil, water, gas.) Examples of fluid properties include oil viscosity, oil formation factor ($B_0$), and pressure, temperature, and saturation in each of the cells. Nonlinear terms in these equations are linearized to arrive at a set of linear equations for each timestep of the simulation. These linear equations can then be solved to estimate solutions for unknowns such as pressure and saturation in the cells. From these values of pressure and saturation other properties can be estimated including the overall production of oil, gas and water from the reservoir in a timestep. The aforementioned steps are repeated over many such timesteps to simulate fluid flow over time in the reservoir.

The permeability of natural formations of reservoirs displays high levels of variability and complex structures of spatial heterogeneity which spans a wide range of length scales. In order to improve the reliability of petroleum reservoir simulation models, much effort has been directed towards characterizing the reservoir properties in great detail. Consequently, efficient numerical algorithms are required to tackle the resulting high resolution simulation models (with several million grid cells). Recent advances in multi-scale methods have enhanced the ability to make predictions of flow and transport in highly detailed heterogeneous reservoir models. U.S. Pat. No. 6,823,297 to Jenny et al., U.S. Patent Appln. 20050203725 to Jenny et al. and papers by Jenny, P., S. H. Lee, and H. A. Tchelepi: 2003, *Multi-Scale Finite-Volume Method for Elliptic Problems in Subsurface Flow Simulation*. J. Comp. Phys. 187, 47-67; and Jenny, P., S. H. Lee, and H. A. Tchelepi: 2004, *Adaptive Multi-scale Finite Volume Method for Multi-Phase Flow and Transport*. Multiscale Model. Simul. 3, (1) 2004, 50-64, describe a multi-scale finite volume (MSFV) method for single phase flow and adaptive IMPES (i.e., implicit pressure, explicit saturations. The MSFV method solves flow and transport sequentially. To compute a fine-scale flow field, dual basis functions, which are solutions of local problems on a dual grid, are used to construct a global coarse scale system of equations, which can be solved to obtain global coarse grid pressures. A velocity field is reconstructed on the fine-scale using primal basis functions. In the MSFV approach, a block based Schwarz overlapping technique is used to solve hyperbolic saturation equations (i.e. the transport problem). This MSFV method has been proven to be accurate for strongly heterogeneous problems.

Black oil formulation is often used to perform simulation studies in practice. In a black oil model, three components, which are defined as fluid phases at standard (surface) conditions, are used to represent a fluid system. The hydrocarbon system is described using two pseudo components, namely oil and gas, and the third component represents water. The phase behavior of the fluid system is described using solubilities and formation volume factors.

The conservation equations of the three pseudo components are nonlinear. They are parabolic due to capillarity (three immiscible fluid phases) and compressibility (rock and fluids). However, in most settings, reservoir displacement processes are dominated by convection, so that the pressure field is nearly elliptic, while the saturation equations display nearly hyperbolic behavior.

In the MSFV method of Jenny et al., dual-grid basis functions, which are solutions to local problems on the dual grid, are used to assemble an upscaled transmissibility field on the coarse grid. Solution of this global system yields the coarse scale pressure field. A fine scale pressure field can be reconstructed using the dual-grid basis functions. Fine scale saturation equations are then solved using the reconstructed fine scale velocity field. In the saturation equation, a Schwarz overlap method is applied directly for a primal coarse cell with local boundary conditions. For more details of the calculation of the MSFV method and the use of dual-grid basis functions, see Appendix A below.

Prior multi-scale methods typically deal with single- or two-phase flow and only consider very simplified physics. They neglect capillary pressure, gravity, and dissolution. They also assume that both the porous medium and the fluids are incompressible. Accordingly, there is a need for a multi-scale finite volume method which addresses the effects of compressibility, capillary pressure and gravity.

SUMMARY OF THE INVENTION

The present invention utilizes a multi-scale finite-volume (MSFV) method to deal with nonlinear immiscible three phase compressible flow in the presence of gravity and capillary forces (i.e., black oil model). Consistent with the MSFV framework, flow and transport are treated separately and differently, preferably using a fully implicit sequential algorithm. The pressure field is solved using an operator splitting algorithm. The general solution of the pressure is decomposed into an elliptic part, a buoyancy/capillary force dominant part, and an inhomogeneous pant with source/sink (wells) and accumulation. A MSFV method is used to compute the basis functions of the elliptic component, which captures long range interactions in the pressure field. Direct construction of the velocity field and solution of the transport problem on the primal coarse grid allows for wide flexibility in accommodating physical mechanisms, such as compressibility, capillary pressure, and buoyancy.

It is an object of the present invention to provide an efficient algorithm for a black oil model using a multi-scale finite volume method in reservoir simulation.

An operator splitting algorithm is devised to compute the pressure field. The general solution of the pressure is decomposed into elliptic, buoyancy dominated, and capillary dominated parts. The effect of wells (sources/sinks) on the flow field is represented as a particular solution.

A method for simulating the properties of a fluid-containing subterranean reservoir includes the step of partitioning a reservoir model of a subterranean reservoir into a grid of fine cells and respective grids of primal coarse cells and dual coarse cells which overlie the grid of fine cells. A first pressure equation is constructed. The first pressure equation includes a homogenous equation component $p_h$, a gravity and capillarity equation component $p_g$, and an inhomogeneous equation component $p_p$ associated with at least one of sources and sinks and accumulation. The homogenous equation component $p_h$ is solved to obtain dual basis functions utilizing local boundary conditions on the dual coarse cells. The gravity and capillarity equation component $p_g$ is solved to arrive at a summation of products of primal coarse cell pressures and dual basis functions and a correction term. The inhomogeneous equation component $p_p$ is solved to arrive at primal coarse cell pressure equations utilizing the basis functions in conjunction with the correction term. The primal coarse cell pressure equations are solved for primal coarse cell pressures. Then pressures in the fine cells are constructed which are a combination of products of primal coarse cell pressures and basis functions augmented by the correction term from the $p_g$ equation.

The method can also include the step of constructing Neumann boundary conditions on the primal coarse cells utilizing the fine cell pressures previously calculated. In the method, the conventional pressure equations on the fine cells contained in each primal coarse cell can be calculated with the Neumann boundary conditions applied at the boundaries of the primal coarse cell to arrive at improved fine cell pressures. In the method, transport equations for each phase in the fine cells can be solved utilizing, the improved fine cell pressures to arrive at fine cell saturations for each of the phases. In the method, the mobility and mobility changes and pressure changes can be calculated in each fine cell. If mobility changes and pressure changes are not within a predetermined tolerance, then the method steps can be repeated repeat until the tolerance is satisfied. In the method the pressure and saturations in the fine cells can be outputted, and then proceed to the next time step by repeating the previous steps of the method.

In the method, the solving of the homogeneous equation component $p_h$ can include employing the basis functions and a correction function. The correction function can be used to account for gravity effects and correct a course scale operator.

An aspect of the present invention includes a tangible media carrying computer-readable instructions for carrying the steps of the method. Another aspect of the present invention includes a system comprising computer hardware and tangible media carrying computer instructions for carrying out the steps of the method.

According to another aspect of the invention, a method for simulating the properties of a fluid-containing subterranean reservoir includes the step of partitioning a reservoir model of a subterranean reservoir into a grid of fine cells and respective grids of primal coarse cells and dual coarse cells which overlie the grid of fine cells. An approximate pressure field is computed, which including, a solution of a course-scale pressure equation. Fine-scale fluxes are constructed. A phase-transport equation is computed.

In the method the step of computing the approximate pressure field can include a juxtaposition of local solutions computed on the dual course cells. In the method the step of computing the approximate pressure field can also include computing a fine-scale pressure approximation responsive to a set of basis functions and a correction function. In the method the course-scale pressure equation can be an elliptic homogenous equation ph, and the basis functions comprise local solutions to the elliptic homogenous equation. In the method, the step of computing the approximate pressure field can include using the basis equations to relate a course-grid pressure to a finite scale pressure distribution and extract course-scale transmissibilities. In the method the correction function can be independent of the course-scale pressure. The correction function can account for gravitational effects on the fluid in the reservoir and can correct a course-scale operator.

According to yet another aspect of the invention, a method for simulating the properties of a fluid-containing subterranean reservoir includes the step of partitioning a reservoir model of a subterranean reservoir into a grid of fine cells and respective grids of primal coarse cells and dual coarse cells which overlie the grid of fine cells. An approximate pressure field is computed. The computing of the approximate pressure filed includes computing a solution of a course-scale pressure equation. The computing of the approximate pressure field includes a juxtaposition of local solutions computed on the dual course cells. The computing of the approximate pressure field includes computing a fine-scale pressure approximation responsive to a set of basis functions and a correction function. Fine-scale fluxes are constructed. A phase-transport equation is computed.

In the method, the course-scale pressure equation can be an elliptic homogenous equation $p_h$, and the basis functions can comprise local solutions to the elliptic homogenous equation. In the method, the step of computing the approximate pressure field can also include using the basis equations to relate a course-grid pressure to a finite scale pressure distribution, and extract course-scale transmissibilities. In the method, the correction function can be independent of the course-scale pressure. In the method, the correction function can be utilized to account for gravitational effects on the fluid in the reservoir, and correct a course-scale operator.

BRIEF DESCRIPTION OF THE DRAWINGS

These and other objects, features and advantages of the present invention will become better understood with regard to the following description, pending claims and accompanying drawings where:

FIGS. 14A-14D illustrate water-phase saturation at three different times (14A-14C) and the natural logarithm of the heterogeneous permeability field (14D).

FIG. A1, associated with Appendix A, illustrates a coarse 2D grid of coarse cells with an overlying dual coarse grid including a dual coarse control volume and an underlying fine grid of fine cells;

FIG. A2 illustrates a coarse grid including nine adjacent coarse cells (bold solid lines) with a corresponding overlying dual coarse grid (bold dashed lines) including dual coarse control volumes and an underlying fine grid (thin dotted lines) of fine cells; and FIG. A3 shows flux contribution $q_A^{(2)}$ and $q_B^{(2)}$ due to the pressure in a particular coarse cell 2.

DETAILED DESCRIPTION OF THE INVENTION

1. Overview

Most practical reservoir simulation studies are performed using the so-called black oil model in which phase behavior is represented using solubilities and formation volume factors. The present invention extends the multi-scale finite-volume (MSFV) method, as referenced above, to deal with nonlinear immiscible three phase compressible flow in the presence of gravity and capillary forces (i.e., black oil model). Consistent with the MSFV framework, flow and transport are treated separately and differently, preferably using a fully implicit sequential algorithm. The pressure field is solved using an operator splitting algorithm. The general solution of the pressure is decomposed into an elliptic part, a buoyancy/capillary force dominant part, and an inhomogeneous part with source/sink (wells) and accumulation. A MSFV method, similar to that described in U.S. Pat. No. 6,823,297, is used to compute the basis functions of the elliptic component, which captures long range interactions in the pressure field. The methodology is demonstrated using black oil examples of nonlinear compressible multiphase flow in strongly heterogeneous formations. Direct construction of the velocity field and solution of the transport problem on the primal coarse grid allows for wide flexibility in accommodating physical mechanisms, such as compressibility, capillary pressure, and buoyancy.

Figure 1A:
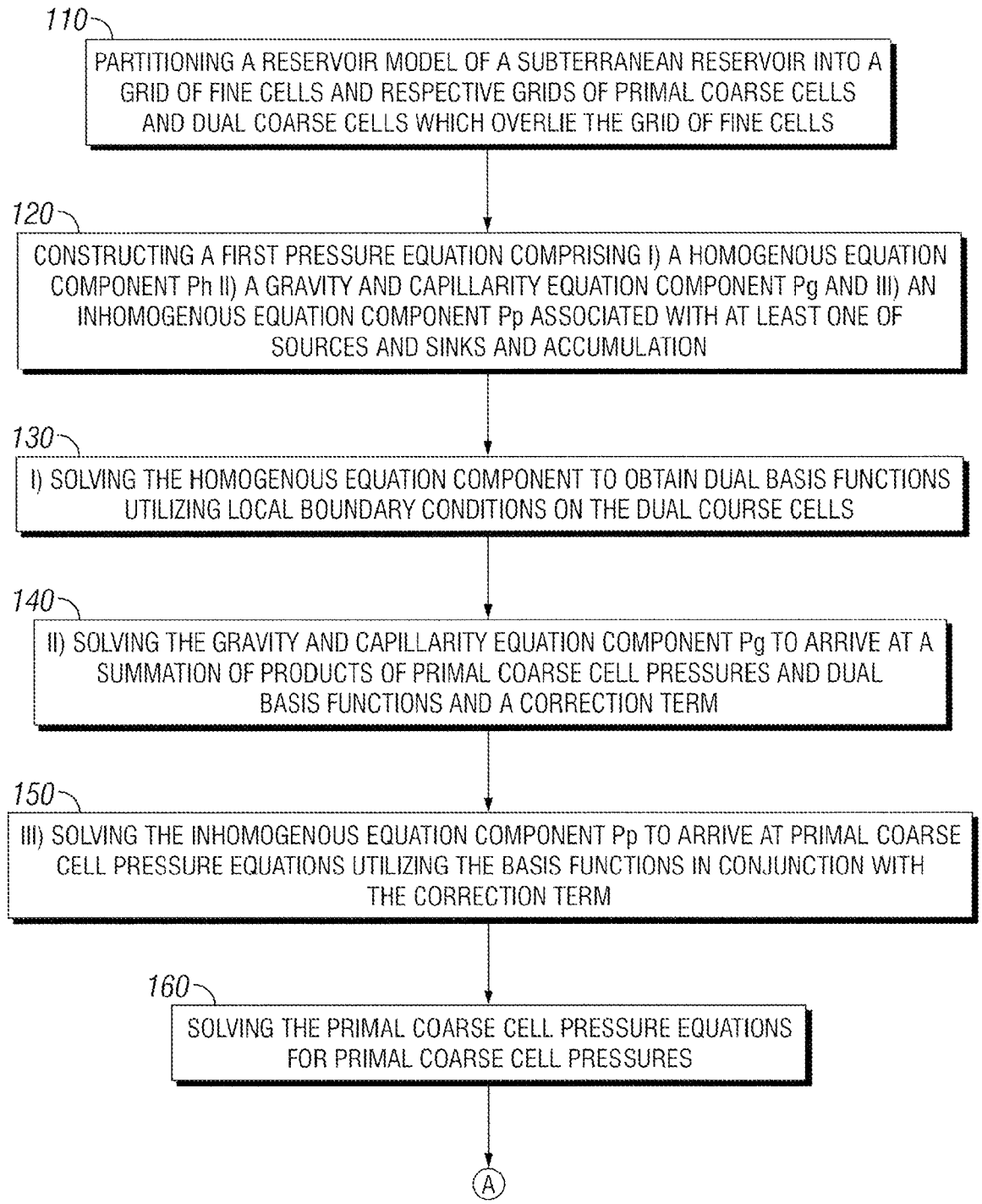
FIGS. 1A and 1B are a flowchart of a method, practiced in accordance with the present invention, for simulating fluid flow in a subterranean reservoir.
Figure 1B:
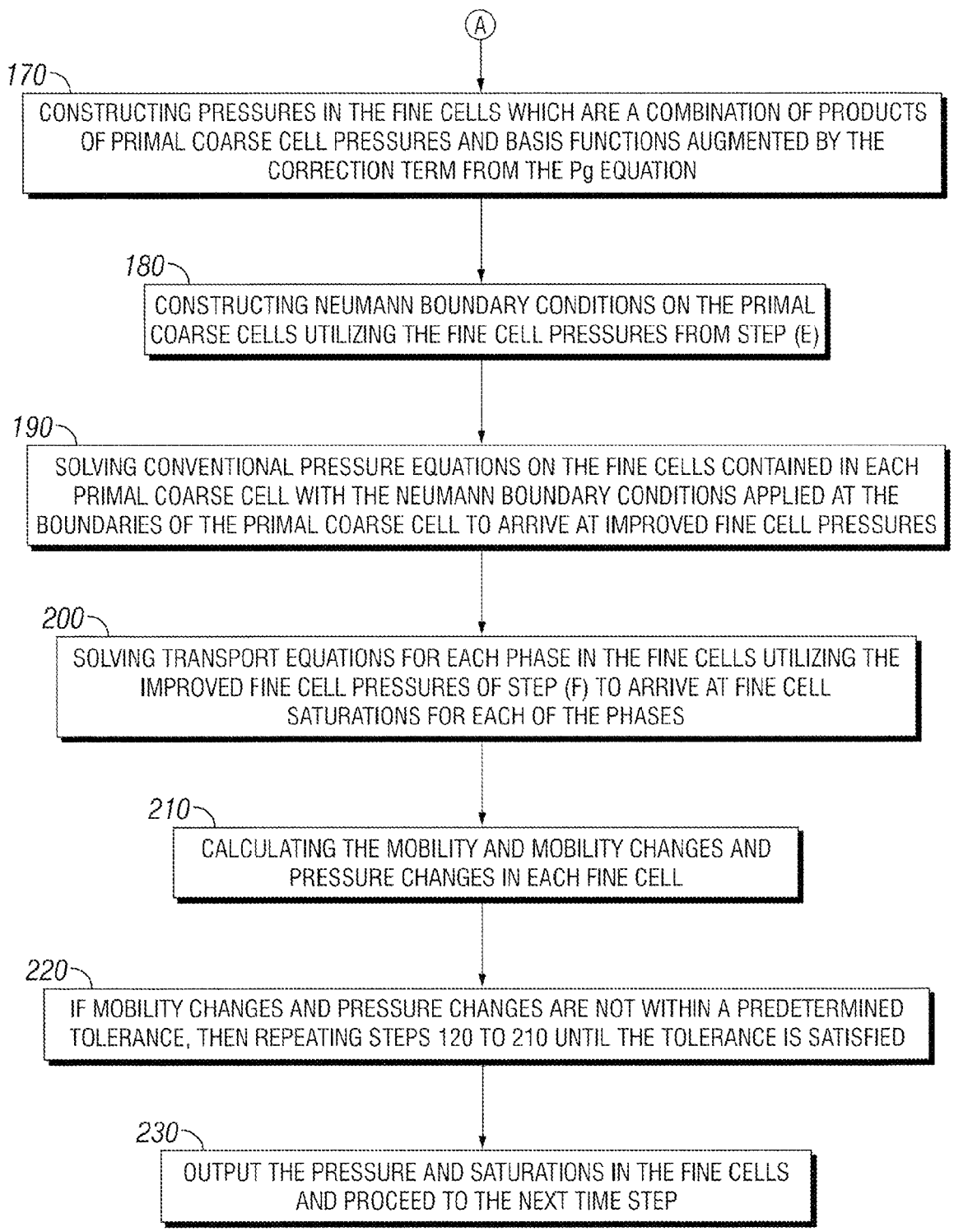

FIGS. 1A and 1B are a flow chart depicting steps taken in a preferred embodiment of the present invention which are as follows:

partitioning a reservoir model of a subterranean reservoir into a grid of fine cells and respective grids of primal coarse cells and dual coarse cells which overlie the grid of fine cells; 110 constructing a first pressure equation comprising i) a homogenous equation component $p_h$; ii) a gravity and capillarity equation component $p_g$; and iii) an inhomogeneous equation component $p_p$ associated with at least one of sources and sinks and accumulation; 120

(i) solving the homogenous equation component to obtain dual basis functions utilizing local boundary conditions on the dual coarse cells; 130

(ii) solving the gravity and capillarity equation component $p_g$ to arrive at a summation of products of primal coarse cell pressures and dual basis functions and a correction term; 140

(iii) solving the inhomogeneous equation component $p_p$ to arrive at primal coarse cell pressure equations utilizing the basis functions in conjunction with the correction term; 150 solving the primal coarse cell pressure equations for primal coarse cell pressures; 160 constructing pressures in the fine cells which are a combination of products of primal coarse cell pressures and basis functions augmented by the correction term from the pg equation; 170 constructing Neumann boundary, conditions on the primal coarse cells utilizing the fine cell pressures from step (e); 180 solving conventional pressure equations on the fine cells contained in each primal coarse cell with the Neumann boundary conditions applied at the boundaries of the primal coarse cell to arrive at improved fine cell pressures; 190 solving transport equations for each phase in the line cells utilizing the improved fine cell pressures of step (f) to arrive at fine cell saturations for each of the phases; 200 calculating the mobility and mobility changes and pressure changes in each fine cell; 210 if mobility changes and pressure changes are not within a predetermined tolerance, then repeating steps 120 to 110 until the tolerance is satisfied; 220 and output the pressure and saturations in the fine cells and proceed to the next time step. 230

The detailed description of a preferred embodiment of using the present invention is organized as follows. In section 2, the governing equations for three phase transport are described and a discretized formulation is derived. Transport equations are rearranged to yield a single pressure equation and two phase transport equations. In section 3, an operator splitting scheme is introduced that decomposes the pressure equation into three components. Corresponding multi-scale algorithms are derived for each the three components. Section 4 describes a sequentially fully implicit scheme for solving saturation equations. Also, the use of adaptivity in the MSFV method is discussed. The novel algorithm of FIG. 3 for a preferred embodiment of this invention is summarized in Section 5. Finally, numerical examples are presented in Section 6.

2. Governing Equations and Discretized Formulation

The standard black oil model includes two hydrocarbon phases (oil and gas) and one aqueous phase (water) with rock and fluid compressibility, gravity effects, and capillary pressure. The thermodynamic equilibrium between the hydrocarbon phases is described by the solubility of gas in oil. The conservation equations are nonlinear due to the strong nonlinear character of the relative permeability and capillary pressure relations, high compressibility (especially of gas), large density and viscosity differences, and phase appearance and disappearance effects.

The governing equations for the black oil formulation are:

$$\frac{\partial}{\partial t}(\phi b_o S_o) = \nabla \cdot (b_o \lambda_o \cdot (\nabla p_o - g\rho_o \nabla z)) - q_o, \quad (1)$$

$$\frac{\partial}{\partial t}(\phi b_w S_w) = \nabla \cdot (b_w \lambda_w \cdot (\nabla p_w - g\rho_w \nabla z)) - q_w, \quad (2)$$

$$\frac{\partial}{\partial t}(\phi(b_g S_g + R_s b_o S_o)) = \nabla \cdot (b_g \lambda_g \cdot (\nabla p_g - g\rho_g \nabla z)) - \quad (3)$$
$$q_g + \nabla \cdot (R_s b_o \lambda_o \cdot (\nabla p_o - g\rho_o \nabla z)) - R_s q_o,$$

on the domain $\Omega$, with boundary conditions on $\partial \Omega$. Here, $b_l = 1/B_l$ and $\lambda_l = kk_{rl}/\mu_l$ for phases l=o, w, g (i.e., oil, water and gas). $B_l$ denotes the formation volume factor of phase l, i.e., the volume at reservoir conditions to volume at standard conditions. Similarly, $S_l$, $k_{rl}$, $\mu_l$, $\rho_l$ denote, respectively, the saturation, relative permeability, viscosity, and density of phase l. The well volumetric flow rate is $q_l$. The tensor k describes the permeability field, which is usually represented as a complex multi-scale function of space that tends to be highly discontinuous in discrete representations. Porosity is denoted by $\phi$, $p_l$ is the phase pressure, g is gravitational acceleration, z denotes reservoir depth, and $R_s$ is the solubility of gas in oil. In general, $\mu_l$, $\rho_l$, $B_l$, $R_s$ and $\phi$ are functions of pressure. The relative permeabilities, $k_{rl}$, are strong functions of saturation.

Saturations are constrained by:

$$1 = S_o + S_w + S_g, \quad (4)$$

and the three phase pressures $p_w$, $p_o$ and $p_g$ are related by two independent capillary pressure functions:

$$p_w - p_o = p_{owo}(S_o, S_g, S_w), \quad (5)$$

$$p_g - p_o = p_{ogo}(S_o, S_g, S_w) \quad (6)$$

The oil phase pressure is chosen as the primary variable. $p = p_o$ and substituted for the others in Eqs. (1) to (3). The following semi-discrete forms are obtained:

$$\frac{\phi^{n+1} b_o^{n+1} S_o^{n+1} - \phi^n b_o^n S_o^n}{\Delta t} = \{\nabla \cdot (b_o \lambda_o \cdot (\nabla p - g\rho_o \nabla z)) - q_o\}^{n+1}, \quad (7)$$

$$\frac{\phi^{n+1} b_w^{n+1} S_w^{n+1} - \phi^n b_w^n S_w^n}{\Delta t} = \quad (8)$$
$$\{\nabla \cdot (b_w \lambda_w \cdot (\nabla (p + p_{cwo}) - g\rho_w \nabla z)) - q_w\}^{n+1},$$

$$\frac{\phi^{n+1} b_g^{n+1} S_g^{n+1} - \phi^n b_g^n S_g^n}{\Delta t} + \frac{\phi^{n+1} R_s^{n+1} b_o^{n+1} S_o^{n+1} - \phi^n R_s^n b_o^n S_o^n}{\Delta t} = \quad (9)$$
$$\{\nabla \cdot (b_g \lambda_g \cdot (\nabla (p + p_{cgo}) - g\rho_g \nabla z)) +$$
$$R_s b_o \lambda_o \cdot (\nabla p - g\rho_o \nabla z)) - q_g - R_s q_o\}^{n+1}.$$

The time step size is $\Delta t$ and the superscript n denotes the state at the old time level (n+1 is the current time level). Eqs. (7) to (9) are multiplied with factors $\alpha_l$, respectively:

$$\alpha_o = \frac{1}{b_o^{n+1}} - \frac{R_s^{n+1}}{b_g^{n+1}}, \; \alpha_w = \frac{1}{b_w^{n+1}}, \text{ and } \alpha_g = \frac{1}{b_g^{n+1}}, \quad (10)$$

A subsequent summation step removes the dependency of the current level of saturations in the accumulation term of the resulting equitation. If the resulting equation is further linearized around pressure $p^\nu$ for $p^{n+1}$, then the well-known (parabolic) pressure equation is obtained;

$$C \frac{(p^{\nu+1} - p^\nu)}{\Delta t} - \alpha_o \nabla \cdot (\lambda_o^{\prime\nu} \cdot \nabla p^{\nu+1}) - \quad (11)$$
$$\alpha_w \nabla \cdot (\lambda_w^{\prime\nu} \cdot \nabla p^{\nu+1}) - \alpha_g \nabla \cdot (\lambda_g^{\prime\nu} \cdot \nabla p^{\nu+1}) = RHS \text{ with:}$$

$$C = \left.\frac{\partial \phi}{\partial p}\right|^\nu - \phi^n \left(\left.\frac{\partial \alpha_o}{\partial p}\right|^\nu b_o^n S_o^n + \left.\frac{\partial \alpha_w}{\partial p}\right|^\nu b_w^n S_w^n + \left.\frac{\partial \alpha_g}{\partial p}\right|^\nu (b_g^n S_g^n + R_s^n b_o^n S_o^n)\right) + \quad (12)$$
$$\Delta t \left(\left.\frac{\partial \alpha_o q_o}{\partial p}\right|^\nu + \left.\frac{\partial \alpha_w q_o}{\partial p}\right|^\nu + \left.\frac{\partial \alpha_g (q_g + R_s q_o)}{\partial p}\right|^\nu\right)$$

$$RHS = \frac{\phi^n}{\Delta t}((\alpha_o + \alpha_g R_s^n) b_o^n S_o^n + \alpha_w b_w^n S_w^n + \alpha_g b_g^n S_g^n) - \frac{\phi^\nu}{\Delta t} - \quad (13)$$
$$(\alpha_o q_o^\nu + \alpha_w q_w^\nu + \alpha_g (q_g + R_s q_o)^\nu) - \alpha_o \nabla \cdot (g\rho_o \lambda_o^{\prime\nu} \cdot \nabla z) -$$
$$\alpha_w \nabla \cdot (g\rho_w \lambda_w^{\prime\nu} \cdot \nabla z) - \alpha_g \nabla \cdot (g\rho_g \lambda_g^{\prime\nu} \cdot \nabla z) +$$
$$\alpha_w \nabla \cdot (\lambda_w^\prime \cdot \nabla p_{cwo})^\nu + \alpha_g \nabla \cdot (\lambda_g^\prime \cdot \nabla p_{cgo})^\nu \text{ and:}$$

$$\lambda_o^{\prime\nu} = b_o^\nu \lambda_o^\nu, \; \lambda_w^{\prime\nu} = b_w^\nu \lambda_w^\nu, \text{ and } \lambda_g^{\prime\nu} = b_g^\nu \lambda_g^\nu + R_s^\nu b_o^\nu \lambda_o^\nu. \quad (14)$$

For a cell (i,j,k) in a Cartesian grid the advection terms in Eq. (11) is modeled by 5:

$$\alpha_l \nabla \cdot (\lambda_l^{\prime\nu} \cdot \nabla p^{\nu+1}) = \quad (15)$$
$$\alpha_l \lambda^{\prime\nu} \left[\tau_{x,i\pm\frac{1}{2},j,k}(p_{i\pm1,j,k}^{\nu+1} - p_{i,j,k}^{\nu+1}) + \tau_{y,i,j\pm\frac{1}{2},k}(p_{i,j\pm1,k}^{\nu+1} - p_{i,j,k}^{\nu+1}) + \tau_{s,i,j,k\pm\frac{1}{2}}(p_{i,j,k\pm1}^{\nu+1} - p_{i,j,k}^{\nu+1})\right],$$

where the local fine scale transmissibilities for Cartesian grids are given by:

$$\tau_{x,i\pm\frac{1}{2},j,k} = 2\frac{k_{x,i\pm\frac{1}{2},j,k}\Delta y_j \Delta z_k}{\Delta x_i + \Delta x_{i\pm1}}, \quad (16)$$

$$\tau_{y,i,j\pm\frac{1}{2},k} = 2\frac{k_{y,i,j\pm\frac{1}{2},k}\Delta x_i \Delta z_k}{\Delta y_j + \Delta y_{j\pm1}},$$

-continued $$\tau_{s,i,j,k\pm\frac{1}{2}} = 2\frac{k_{s,i,j,k\pm\frac{1}{2}}\Delta x_i \Delta y_j}{\Delta z_k + \Delta z_{k\pm 1}}.$$

For a Cartesian grid where the grid lines are aligned with the principal directions of the heterogeneity, the interface permeability becomes the harmonic means of the values of two adjacent cells. For instance, the interface permeability in x direction becomes:

$$k_{i\pm\frac{1}{2},j,k} = \frac{(\Delta x_i + \Delta x_{i\pm 1})k_{x,i,j,k}k_{x,i\pm 1,j,k}}{\Delta x_i k_{x,i\pm 1,j,k} + \Delta x_{i\pm 1}k_{x,i,j,k}}. \quad (17)$$

For a more general case with nonorthogonal grids and tensor permeabilities, the transmissibilities become multipoint stencils, in place of the two-point approximation of Eq. (15).

Eq. (11) is solved for $p^{\nu+1}$ at the beginning of each iteration of a Newton Raphson loop and the updated pressure is then used to derive the linearized transport equations:

$$\frac{\phi^{\nu+1}b_l^{\nu+1}S_l^{\nu+1} - \phi^n b_l^n S_l^n}{\Delta t} + \delta_l^g \frac{\phi^{\nu+1}R_s^{\nu+1}b_o^{\nu+1}S_o^{\nu+1} - \phi^n R_s^n b_o^n S_o^n}{\Delta t} = \quad (18)$$

$$\nabla \cdot \left(b_l^{\nu+1}\left(\lambda_l^{\nu} + \sum_{i=o,w,g}\left.\frac{\partial \lambda_l}{\partial S_i}\right|^{\nu}(S_i^{\nu+1} - S_i^{\nu})\right)\cdot(\nabla p^{\nu+1} - gp_l\nabla z)\right) -$$

$$(q_l + \delta_l^g R_s q_o)\Big|_{p^{\nu+1},S_o^{\nu},S_w^{\nu}} - \sum_{i=o,w,g}\left(\frac{\partial q_l}{\partial S_i} + \delta_l^g R_s \frac{\partial q_o}{\partial S_i}\right)\Big|_{p^{\nu+1},S_o^{\nu},S_w^{\nu}}$$

$$(S_i^{\nu+1} - S_i^{\nu}) +$$

$$\delta_l^g R_s b_o \left(\lambda_o + \sum_{i=o,w,g}\left.\frac{\partial \lambda_o}{\partial S_i}\right|^{\nu} (S_i^{\nu+1} - S_i^{\nu})\right)\cdot(\nabla p^{\nu+1} - gp_o\nabla z).$$

where $l\in\{o,w,g\}$ stands for oil, water, and gas. The third phase can be readily computed from the simple saturation constraint (4) at the end of each iteration if Eq. (18) is solved for $S_o$ and $S_w$. Note that the states denoted by the superscripts $\nu$, $\nu+1$, and $n+1$ are the same after convergence is achieved.

3. Multi-Scale Finite-Volume Formulation

The teachings of U.S. Pat. No. 6,823,297 to Jenny et al., U.S. Patent Appln. 20050203725 to Jenny et al. Jenny, P., S. H. Lee, and H. A. Tchelepi: 2003, *Multi-Scale Finite-Volume Method for Elliptic Problems in Subsurface Flow Simulation.* J. Comp. Phys. 187, 47-67. Jenny, P., S. H. Lee, and H. A. Tchelepi: 2004, *Adaptive Multi-scale Finite Volume Method for Multi-Phase Flow and Transport.* Multi-scale Model. Simul. 3, 50 64, are hereby incorporated by reference in their entireties into this specification. See Appendix A below for a condensed summary of methods described in U.S. Pat. No. 6,823,297.

Figure 2:
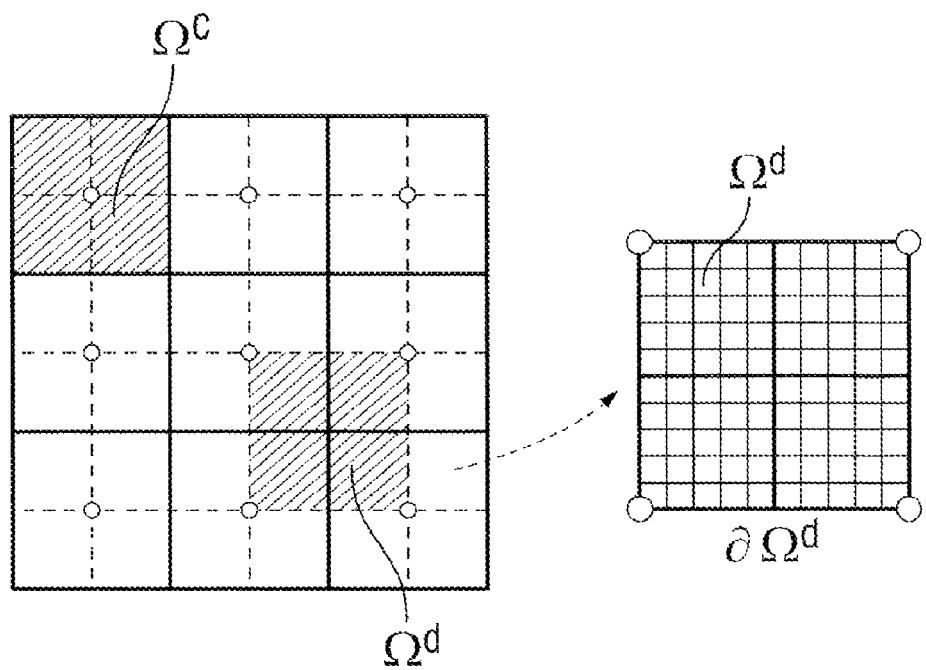
FIG. 2 shows (a) a global problem domain partitioned into a primal (solid lines) and dual coarse grid (dashed line) and (b) dual control volume blown up depicting an underlying fine grid structure.

In the multi-scale finite-volume (MSFV) algorithms described in the references, the global (fine scale) problem domain is partitioned into primal and dual coarse volumes as similarly illustrated in FIG. 2. A set of pressure basis functions is computed for each dual volume and the coarse grid, pressure is solved using upscaled transmissibilities. The same pressure basis functions allow for reconstruction of the fine scale pressure from the coarse solution.

The original MSFV algorithm of these references was originally designed to solve the elliptic pressure equation for incompressible flow in highly heterogeneous formations. The black oil model, which accounts for compressibility and capillarity effects, yields a nonlinear parabolic pressure equation. However, compressibility and capillary effects are in general, quite small. As a result, the pressure equation exhibits a nearly elliptic behavior. A multi-scale algorithm is designed for pressure based on this observation.

In a preferred embodiment of this invention, the pressure is decomposed into a homogeneous part and two inhomogeneous parts. The homogeneous (elliptic) component is denoted by $p_h$; the inhomogeneous part is composed of two contributions: gravity and capillarity, $p_g$ and additional source/sink due to well and nonlinearity of physical parameters, $p_p$. Following this procedure, the governing equations for the different pressure components can be written as, $$p = p_h + p_g + p_p, \quad (19)$$

and the pressure equation becomes:

$$-\alpha_o \nabla \cdot (\lambda_o^{\prime\nu} \cdot \nabla p_h^{\nu+1}) - \quad (20)$$
$$\alpha_w \nabla \cdot (\lambda_w^{\prime\nu} \cdot \nabla p_h^{\nu+1}) - \alpha_g \nabla \cdot (\lambda_g^{\prime\nu} \cdot \nabla p_h^{\nu+1}) = 0 \text{ where,}$$

$$-\alpha_o \nabla \cdot (\lambda_o^{\prime\nu} \cdot \nabla p_g^{\nu+1}) - \quad (21)$$
$$\alpha_w \nabla \cdot (\lambda_w^{\prime\nu} \cdot \nabla p_g^{\nu+1}) - \alpha_g \nabla \cdot (\lambda_g^{\prime\nu} \cdot \nabla p_g^{\nu+1}) = RHS1$$

$$-\alpha_o \nabla \cdot (\lambda_o^{\prime\nu} \cdot \nabla p_p^{\nu+1}) - \alpha_w \nabla \cdot (\lambda_w^{\prime\nu} \cdot \nabla p_p^{\nu+1}) - \alpha_g \nabla \cdot (\lambda_g^{\prime\nu} \cdot \nabla p_p^{\nu+1}) = \quad (22)$$
$$\frac{C}{\Delta t}[(p_h + p_g + p_p)^{\nu+1} - (p_h + p_g + p_p)^{\nu}] + RHS2,$$

The pressure due to capillary force is in general much smaller and localized than the pressure due to viscous force and gravity. The first term in the right hand side of Eq. (22) vanishes as the pressure solution converges ($p^{\nu+1} - p^{\nu} \to 0$) and the second term becomes only the source/sink as the fluid becomes incompressible ($\alpha_l \to 1$). In the subsequent sections, the modifications to the original (incompressible) MSFV framework are discussed that can accommodate the operator splitting approach of Eq. (19).

3.1. Homogeneous Pressure Solution

The original MSFV method of U.S. Pat. No. 6,823,297 yields an accurate fine scale pressure solution by employing a coarse grid. The reconstructed fine scale field is obtained using the coarse scale pressure solution and the locally computed basis functions. A general MSFV algorithm for the black oil formulation will now be derived. A conforming coarse grid with N nodes and M cells is constructed on the original fine grid (see FIG. 2). Each coarse cell, $\Omega_i^c$ ($i \in \{1, \ldots, M\}$), is composed of multiple fine cells. A dual coarse grid, conforming to the fine grid, is constructed such that each dual coarse cell, $\Omega_j^d$ ($j \in \{1, \ldots, N\}$), contains exactly one node of the coarse grid in its interior. The coarse dual grid has M nodes, $x_i$ ($i \in \{1, \ldots, M\}$), each in the interior of a coarse cell $\Omega_i^d$. Each dual grid has $N_c$ corners (four in two dimensions and eight in three dimensions). A set of dual basis functions, $\Theta_j^i$, is constructed; one for each corner i of each dual coarse cell $\Omega_j^d$.

The dual basis functions are used to assemble a coarse scale transmissibility field, which is used to compute the coarse scale pressure, $p_i^c$. The dual basis function $\Theta_j^i$, for example, is the local solution of Eq. (20):

$$\alpha_o \nabla \cdot (\lambda \text{hd } o^{iv} \cdot \nabla \Theta_j^i) + \alpha_w \nabla \cdot (\lambda_w^{iv} \cdot \nabla \Theta_j^i) + \alpha_g \nabla \cdot (\lambda_g^{iv} \cdot \nabla \Theta_j^i)$$
$$= 0 \text{ on } \Omega_j^d, \quad (25)$$

where the underlying fine grid, the fine scale total mobility field, and the reduced problem boundary condition:

$$\frac{\partial}{\partial x_t}(\Lambda \cdot \nabla \Theta_j^i)_t = 0 \text{ on } \partial \Omega_j^d \quad (26)$$

are used. Here, the subscript t denotes the tangential vector component to $\partial \Omega_j^d$ and:

$$\Lambda = \Lambda_o + \Lambda_w + \Lambda_g = \alpha_o \lambda_o^f + \alpha w \lambda_w^f + \alpha_g \lambda_g^f. \quad (27)$$

The value at the node $x_k$ of $\Omega_j^d$ is given by:

$$\Theta_j^i(x_k) = \delta_{ik}, \quad (28)$$

where $\delta_{ik}$ is the Kronecker delta. By definition $\Theta_j^i(x) \equiv 0$ for $x \notin \Omega_j^d$. Effective coarse scale transmissibilities are extracted from the dual basis functions $\Theta_j^i$. A set of fine scale basis functions, $\Theta_i^k$, is constructed; for each coarse cell $\Omega_i^c$, one basis function for each adjacent coarse cell $\Omega_k^c$, which includes $\Omega_i^c$. The boundary conditions for the local computations of the fine scale basis functions are extracted from the dual basis functions. Finally, given a coarse scale solution $p_i^c$, the phase flux across the interface:

$$\partial \Omega_i^{c1i_2} = \partial \Omega_i^{c1} \cap \partial \Omega_i^{c2}, \quad (29)$$

is approximated by:

$$F_l^{i_1 i_2} = \sum_{i=1}^{M} \overline{T}_{l,i}^{i_1 i_2} p_i^c, \text{ for } l = o, w, g \quad (30)$$

where $T_{l,i}^{i_1 i_2}$ are phase transmissibilities obtained as follows:

$$\overline{T}_{l,i}^{i_1 i_2} = \int_{\partial \Omega_{i_1 i_2}^c} \sum_{j=1}^{N} (\lambda_l' \cdot \nabla \Theta_j^i) \cdot nd\Gamma. \quad (31)$$

The vector n is the unit normal of $\partial \Omega_{i_1 i_2}^c$ pointing in the direction from $\Omega_{i_1}^c$ to $\Omega_{i_2}^c$. Note that the homogeneous solution is later used to compute a coarse grid pressure operator (restriction operator) and the coarse grid solution is interpolated to fine grid solution via the basis functions prolongation operator).

3.2. Inhomogeneous Solution with Gravity and Capillary Pressure

As shown in Eq. (21), the inhomogeneous solution $p_g$ accounts for gravity and capillary forces. Due to the complexity of the fractional flow function in the presence of gravity, the potential field cannot be represented by a simple superposition of the basis functions. An efficient algorithm is proposed to compute $p_g$ by splitting it into two parts. The first part is represented by the original basis functions; the second part is a correction term based on solving a local problem that accounts for buoyancy effects. Following this idea, $p_g$ is decomposed into two parts:

$$p_g = p_g^a + p_g^b = \sum_i \Theta_j^i p_g^{c,i} + p_g^b \text{ in } \Omega_j^d. \quad (32)$$

Note that in the dual coarse grid $\Omega_j^d, p_g^a$ is represented by a weighted linear combination of the coarse grid pressure, $p_g^{c,i}$, where the weights are given by the basis functions. The correction term, $p_g^b$ is obtained from Eq. (21):

$$-\alpha_o \nabla \cdot (\lambda_o^{iv} \cdot \nabla p_g^b) - \alpha_w \nabla \cdot (\lambda_w^{iv} \cdot \nabla p_g^b) - \alpha_g \nabla \cdot (\lambda_g^{iv} \cdot \nabla p_g^b)$$
$$= RHS1 \text{ in } \Omega^d \quad (33)$$

where solutions of reduced problems consistent with Eq. (33) serve as boundary conditions:

$$\frac{\partial}{\partial x_t}(\Lambda \cdot \nabla p_g^b)_t = -\frac{\partial}{\partial x_t}(G)_t \text{ on } \partial \Omega_j^d, \text{ where:} \quad (34)$$

$$G = \quad (35)$$
$$(\alpha_o \rho_o \lambda_o' + \alpha_w \rho_w \lambda_w' + \alpha_g \rho_g \lambda_g')g \cdot \nabla z - \alpha_w \lambda_w' \cdot \nabla p_{cwo} - \alpha_g \lambda_g' \cdot \nabla p_{cgo}$$

As discussed in the previous subsection, the reduced system can be applied along the boundary (edge in two dimensions and interfaces in three dimensions) to specify the boundary conditions for each dual coarse grid. For instance, the reduced systems from Eq. (34) may be solved along the boundary lines with the boundary conditions:

$$p_{g,i}^b = 0 \text{ for } i = 1,4 \quad (36)$$

Note theft the correction term $p_g^b$ is computed with the simple boundary conditions for the reduced system that is independent of the global pressure distribution. This localization assumption to compute $p_g^b$ is analogous to the one used to construct the dual basis function in the absence of gravity effects. Consequently, this localization assumption is effective in resolving the line scale structures of complex heterogeneous problems where buoyancy plays an important role. Substituting Eq. (32) into the governing equation Eq. (21) and applying the Green's theorem for the coarse grid operation, the solution from $p_g^b$ becomes an additional source/sink for the coarse grid operator:

$$\sum_{j=1}^{M} \sum_{k=1}^{M} \overline{T}_{lk}^{ij} p_{g,k}^c = Q_{g,l}^i \text{ for } l = o, w, g \text{ where:} \quad (37)$$

$$Q_{g,l}^i = -\sum_j \int_{\partial \Omega_i} (\lambda_l' \cdot \nabla p_g^b - G) \cdot nd \partial \Omega_j^d \quad (38)$$

Once $p_g^b$ is computed, the coarse grid pressure $p_g^c$ can be computed by the coarse grid transmissibility described in the previous section and the additional source term from $p_g^b$. The $p_g^c$, as a result, does not have to be calculated separately. The coarse grid block pressure can be calculated together with other source/sink and accumulation terms, which are treated in the next section.

3.3. Particular Solution with Wells and Accumulation Terms

In addition to capturing the effects of the presence of sources/sinks (wells) in the domain, the particular solution $p_p$, as given by Eq. 22), accounts for compressibility effects on the accumulation terms. To simplify the derivation of the inhomogeneous solution here, wells are represented as distributed fine scale source terms in the coarse grid containing the well.

The coarse grid transmissibility is obtained from the homogeneous (elliptic) component. If the coarse grid transmissibility field does not change for the particular solution with sources/sinks and accumulation terms, the coarse grid pressure can be computed directly. With the coarse grid transmissibility approximation, a mass balance equation can be written:

$$\sum_{l}^{3} \alpha_{l,i}^{c} \sum_{j=1}^{M} \sum_{k=1}^{M} \overline{T}_{lk}^{ij}(p_{p,k}^{c} + p_{g,k}^{c}) = \quad (39)$$

$$Q_i + Q_g^i - \frac{V_i \overline{C}_i}{\Delta t}[(p_{p,i}^c + p_{g,i}^c)^{v+1} - (p_{p,i}^c + p_{g,i}^c)^{v}]$$

where:

$$Q_i = \sum_{l \in \Omega_i} v_l (\alpha_{o,i}^c q_o^v + \alpha_{w,i}^c q_w^v + \alpha_{g,i}^c (q_g + R_s q_o)^v) l + \quad (40)$$

$$\sum_{l \in \Omega_i} v_l \left[ \frac{\phi^n}{\Delta t}((\alpha_{o,i}^c + \alpha_{g,i}^c R_s^n)b_o^n S_o^n + \alpha_{w,i}^c b_w^n S_w^n + \alpha_{g,i}^c b_g^n S_g^n) - \frac{\phi^v}{\Delta t} \right]_l,$$

$$Q_g^i = \sum_{l} \alpha_{l,i}^c Q_{g,l}^i, \quad (41)$$

$$\overline{C}_i = \frac{1}{V_i} \sum_{l \in \Omega_i} C_l v_l, \text{ and } V_i = \int_{\Omega_i} dV \quad (42)$$

for each coarse cell $\Omega_i^c$ ($i \in \{1, \ldots, M\}$) and the entire system can be solved for the coarse pressure ($p_i^c = p_{p,i}^c + p_{g,i}^c$). Note that a coarse grid $\alpha^c$ factor is employed to minimize the pressure dependency on the new coarse saturation. The following coarse grid $\alpha^c$ factors are used:

$$\alpha_{l,i}^c = \frac{\sum_{j=1}^{M} \phi_i^v S_{l,i}^v}{\sum_{j=1}^{M} \phi_i^v b_{l,i}^v S_{l,i}^v} \quad (43)$$

Once the coarse grid pressure is computed, the fine grid pressure in the dual grid can be obtained using the basis functions:

$$p_p(x) + p_g(x) = \sum_{i=1}^{N_c} \Theta_j^i(x)(p_{p,i}^c + p_{g,i}^c) + p_g^b(x), \text{ for } x \in \Omega_j^d \quad (44)$$

The pressure from the particular solution and the linear gravity part is interpolated by the dual grid basis functions and then the correction gravity pressure is added.

3.4 Conservative Velocity Field and Improved Pressure Field

The velocity field as readily obtained from the reconstructed fine pressure (i.e. using coarse grid solution $p_i^c$ and the dual basis functions $\Theta_j^i$) suffers from local mass balance errors at the dual coarse cell boundaries. As a remedy a second set of (primal) basis functions may be used for the construction of a conservative velocity field. Using the fine scale fluxes obtained from the dual basis functions as boundary conditions when computing the fine scale basis functions ensures that the reconstructed fine scale velocity field is conservative (See FIG. 3). Even though an adaptive method can be employed to eliminate unnecessary, computation of the second set of basis functions, the large number of such basis functions does not guarantee that this approach is numerically more efficient than direct computation of the velocity and saturation fields every time step, or iteration.

As a result, a direct approach is used for obtaining velocities instead for this preferred embodiment. This is, in constructing the velocity field on local domains, the reconstructed fine scale pressure solution is sampled at the local boundaries for fluxes and local Neumann problems are solved. The direct velocity construction allows all nonlinear effects to be included (i.e., full black oil physics), however, adaptivity may be lost. As a secondary benefit, the fine pressure solution obtained from the Neumann solution is likely to be of higher quality (i.e., it is locally consistent with the velocity field) as compared to the pressure solution reconstructed from the coarse solution and the basis functions (as in the original multi-scale method of U.S. Pat. No. 6,823,297. This direct approach will now be detailed.

From the coarse grid pressure solution and the dual grid basis functions, the fine grid pressure field in a primal coarse grid, $\partial \Omega^c$, as shown in Eq. (44), is constructed. The Neumann boundary conditions are constructed along the primal coarse grid, $\partial \Omega^c$:

$$u = u_o + u_w + u_g = \alpha_o \lambda_o \cdot \nabla (p - \rho_o g z) + \quad (45)$$

$$\alpha_w \lambda_w \cdot \nabla (p + p_{cwo} - \rho_w g z) + \alpha_g \lambda_g \cdot \nabla (p + p_{cgo} - \rho_g g z)$$

and Eq. (19) is solved for the fine scale velocity. In order to obtain a conservative velocity field u which conforms to u', the requirement:

$$u \cdot n = u' \cdot n \quad (46)$$

is imposed at the interfaces between coarse cells, where n is the interface unit normal vector. The local fine scale solution is the solution of Eq. (11) with the local boundary conditions of Eq. (46). Eq. (11) can be rearranged with the local boundary conditions to obtain:

$$C \frac{p^{v+1} - p^v}{\Delta t} - \alpha_o \nabla \cdot (\lambda_o^{\prime v} \cdot \nabla (p - g \rho_o \nabla z)^{v+1}) - \quad (47)$$

$$\alpha_w \nabla \cdot (\lambda_w^{\prime v} \cdot \nabla (p + p_{cwo} - g \rho_w \nabla z)^{v+1}) -$$

$$\alpha_g \nabla \cdot (\lambda_g^{\prime v} \cdot \nabla (p + p_{cgo} - g \rho_g \nabla z)^{v+1}) = RHS3 \text{ on } \Omega_i^d$$

with:

$$RHS3 = \quad (48)$$

$$\frac{\phi^n}{\Delta t}((\alpha_o + \alpha_g R_s^n)b_o^n S_o^n + \alpha_w b_w^n S_w^n + \alpha_g b_g^n S_g^n) - \frac{\phi^v}{\Delta t} - (q_o^v + q_w^v + q_g^v)$$

with the local boundary conditions:

$$u = u^{1k} \cdot n \text{ on } \partial \Omega c, \quad (49)$$

The resulting pressure solution is of good quality and replaces the multi-scale reconstructed pressure solution in the black oil case. The local pressure solution is readily converted to velocities, at the boundary the velocities Eq. (49) will be enforced.

3.5. Saturation Solution

From the conservative pressure field in Eq. (11), the fluxes can be readily computed to a cell and the fluxes substituted in Eq. (18):

$$\frac{\phi^{v+1} b_j^{v+1} S_j^{v+1} - \phi^n b_j^n S_j^n}{\Delta t} = \nabla \cdot \left( u_j^{v+1} \left( 1 + \frac{1}{\lambda_j^v} \sum_{i=o,w} \frac{\partial \lambda_j}{\partial S_i} \bigg|^v (S_i^{v+1} - S_i^v) \right) \right) - \quad (50)$$

$$b_j^{v+1} \left( q_j \bigg|_{p^{v+1}, S_o^v, S_w^v} + \sum_{i \in [o,w]} \frac{\partial q_j}{\partial S_i} \bigg|_{p^{v+1}, S_o^v, S_w^v} (S_i^{v+1} - S_i^v) \right),$$

which are solved for $S_o$ and $S_\omega$ at the end of each iteration. Notice that the states denoted by the superscripts v, v+1, and n+1 are the same after convergence is achieved.

4. Algorithm Summary

The above steps can be summarized into the form of an algorithm as described below.

1. Partition problem space into coarse and dual coarse volumes (i.e., coarse grid and dual grid).

2. Compute dual basis functions ($p_h$) from Eq. (25) and local boundary conditions Eq. (26) and Eq. (28). This can be done adaptively.

3. Compute the correction term of gravity-capillary pressure solution ($p_g^b$) from Eq. (33) and local boundary conditions Eq. (34) and Eq. (35). Compute the coarse pressure values for inhomogeneous equation with source/sink and gravity, $p_i^c$, located at $x_i$, as shown in Eq. (39).

4. The coarse pressure field $p^c$ together with the dual scale basis functions and the gravity-capillary pressure correction term $p_g^k$ are used to construct fine scale pressure for the inhomogeneous equations ($p_p(x)$) in Eq. (44).

5. From the fine scale pressure solution $p(x)=p_h+p_g+p_p$ construct the Neumann boundary conditions for the primal dual grid, Eq. (47). This pressure solution will yield fine scale phase velocity field $u_o$, $u_\omega$, $u_g$.

6. The phase velocities are used to solve phase transport equations on the fine scale. Here an explicit or an implicit discretization scheme cans be used.

7. Using the new saturation distribution, the mobility field λ is updated and the basis functions are recomputed where it is necessary (which includes updating the effective coarse scale transmissibilities). Here an adaptive scheme is preferably applied.

8. If an implicit solution method is applied, one proceeds with the next Newton Raphson iteration by repeating steps 2-7, until convergence is achieved.

9. The next time step is performed by repeating steps 2-8.

5. Sequential Fully Implicit Coupling and Adaptive Computation

The algorithm summarized in the previous section, comprises two major steps. First the phase velocities are obtained from solving the pressure equation with the MSFV method and then the transport, equation is solved on the fine grid by using the reconstructed fine scale phase velocity field u. A Schwarz overlap method is applied for the saturation equations. The transport problem is solved locally on each coarse volume with an implicit upwind scheme, where the saturation values from the neighboring coarse volumes at the previous iteration level are used for the boundary conditions. Once the transport equation is converged (for hyperbolic systems the Schwarz overlap method is very efficient), the new saturation distribution determines the new total mobility field for the elliptic problem of the next Newton iteration. Note that, in general, some of the basis functions have to be recomputed each time step. These steps can be iterated until convergence of all variables at the current time level.

The MSFV approach can be easily adapted to a sequential fully implicit treatment. The MSFV implementation allows for performing an IMPES, traditional sequential, or a fully implicit scheme. Here, the full nonlinear transmissibility terms at the new time step level are retained so that stability is guaranteed. The converged solution using this sequential approach should be generally identical to the solution obtained using the simultaneous solution strategy, which is usually used to deal with the coupled fully implicit system.

Aziz, K. and A. Settari: 1979, Petroleum Reservoir Simulation. Elsevier Applied Scientific Pub. and Watts, J. W.: 1983, 'A Compositional Formulation of the Pressure and Saturation Equations'. In: Proceedings of 7th SPE Symposium on Reservoir Simulation: SPE 122}, San Francisco, Calif., pp. 113-122, investigated a so-called sequential method in which the pressure is solved exactly the same way as for the IMPES method; and then the saturation is obtained with the linearized implicit transmissibilities. The semi-implicit treatment of transmissibility in the second step improves the numerical stability. Since the transmissibilities in the pressure and saturation equations are at different time levels, this formulation will not satisfy the material balance. Nevertheless, the material balance error is very small in a black oil system. Watts derived a sequential algorithm of compositional formulation and also noted that the material balance error was not a problem in applications. A typical time step needs several iterations for hill convergence.

In the conventional implicit scheme in reservoir simulation, a Newton method is used to solve the nonlinear transport equations with variables (e.g., relative permeabilities, pressure and saturation) at a new time level. The linearized equations are solved simultaneously for pressure and saturation changes. Note that this implicit scheme of may be a sequential, iterative implicit scheme that is somewhat different from the conventional fully implicit method. Nevertheless, the solution should converge to the fully implicit solution. The sequential implicit MSFV method has been tested for large and stiff problems and the coupling scheme did not fail, even for very large time steps.

In the iteration of saturation solution, the total velocity between cells should remain constant in order to conserve the mass for each cell. It is thus convenient to use a generalized fractional flow and the total velocity formulation. In the sequential implicit algorithm, the saturation equations are iteratively solved with the total velocity fixed to preserve the conservation of mass (i.e., divergence free). This algorithm can be readily implemented by the total velocity and fractional flow formulation. However, for the case of countercurrent flow, the original fractional flow that is dependent on a single saturation has to be modified in order to maintain mass conservation. The convergence and accuracy of the sequential implicit method with various error tolerances in the outer Newton loop have been examined. The results indicated that this sequential algorithm converges as fast as the fully implicit scheme.

The MSFV is well suited for adaptive computation, which can lead to significant gains in computational efficiency. The most expensive part of the algorithm is the computation of the dual basis functions. In general, this is performed every iteration due to changes in the saturation (mobility) field. An adaptive scheme can be used to update the dual basis functions. Since the basis functions are constructed with local support, the change of the total mobility is used to decide when and where to update the basis functions in the domain.

$$\frac{1}{1+\varepsilon_\lambda} < \frac{\lambda^v}{\lambda^{v-1}} < 1+\varepsilon_\lambda. \quad (51)$$

For a compressible fluid, an effective total mobility change criterion can be employed for adaptable computation of pressure field:

$$\frac{1}{1+\varepsilon_\lambda} < \frac{\lambda_e^v}{\lambda_e^{v-1}} < 1+\varepsilon_\lambda \quad (52)$$

Here, $$\lambda_e = \sum_{j \in (o,w,g)} \alpha_j \lambda_j' \quad (53)$$

and $\in \lambda$ is a user-defined threshold for mobility and pressure change.

6. Numerical Examples

6.1 Computation of Gravity Pressure

Figure 4:
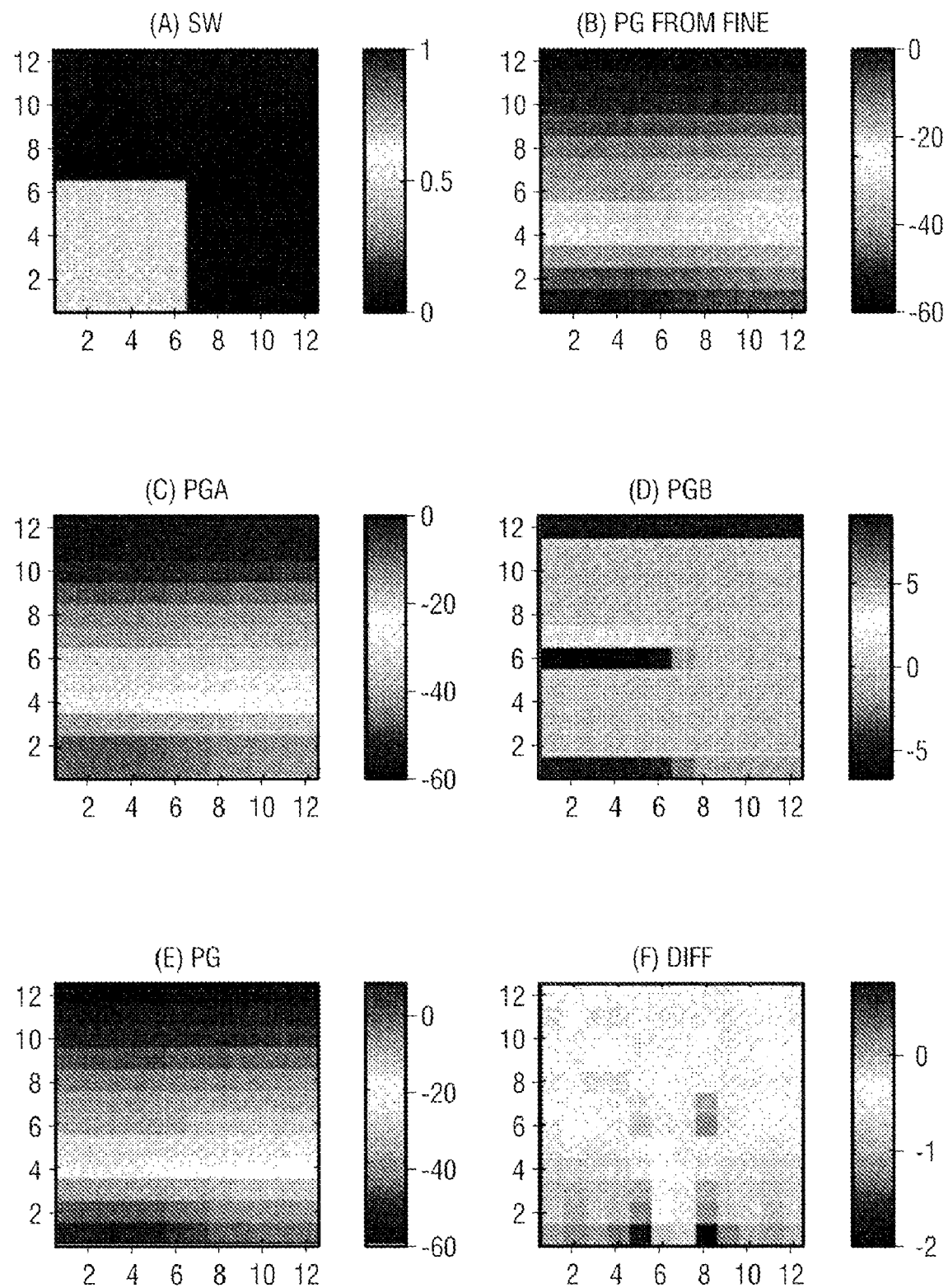
FIGS. 4(a)-(f) show $p_g$ for Example 1.

As the gravity pressure is computed by an operator split, it is instructive to examine the gravity pressure. From numerical experiments, it has been found that the algorithm with local correction is very accurate if the flow is close to one-dimensional vertical notion because the reduced boundary conditions for $p_g^b$ closely represents the real flow field. In this example, the case is studied in which the fluids are very much away from a gravitational equilibrium and also have a strong lateral notion in addition to a vertical motion of fluids. A simple two phase two-dimensional model is constructed with 12×12 fine grids that is divided by 4×4 coarse grids. The oil saturation is given by $S_o$=0.5 for i=1-6 and k=1-6 and $S_o$=1 in the remainder of the model. Density and viscosity for fluids are selected as 1.0 gc/cc and 1 cp for water and 0.5 g/cc and 2 cp for oil, respectively. The quadratic relative permeabilities are employed. In FIG. 4, the original oil saturation is shown in (a) and the gravity pressures computed by the fine scale simulation in (b).

The uneven water saturation in the left lower corner will induce lateral and vertical motion of fluids due to the presence of the density difference of the fluids. The countercurrent flow is expected around the fluid interface and also the water will settle down inside the left-bottom quarter as the water was uniformly distributed ($S_\omega$=0.5).

In (c) and (d) of FIG. 4 it is shown that the two parts of gravity pressure ($p_g^\alpha$ and $p_g^b$i) computed by the multi-scale algorithm discussed above and the combined pressure $p_g$i in FIG. 4(e). In addition the difference of the fine scale simulation and the first multi-scale results from the dual grid is depicted in FIG. 4(f). Due to the lateral motion of fluids in this example, the boundary conditions for the reduced system for dual grid in the multi-scale modeling is less accurate, compared with the first example. Some differences are shown in the gravity pressures from the

TABLE 1

Physical Properties of Black Oil

| | | |
|---|---|---|
| bubble point ($p_b$) | 3300 | [psia] |
| oil density at STC ($p_o$) | 0.8 | [g/cc] |
| water density at STC (pw) | 1 | [g/cc] |
| gas density at STC ($p_g$) | 0.1 | [g/cc] |
| oil viscosity ($\mu_0$) | 2 | [cp] |
| water viscosity ($\mu_\omega$) | 1 | [cp] |
| gas viscosity ($\mu_g$) | 0.1 | [cp] |
| solution gas (Rs) | 90-0.1 (pb-p) | [ft³/bbls] |
| oil compressibility for p > pb | $2.37 \cdot 10^{-5}$ | [1/psia] |
| oil compressibility for p < pb | $-4.8 \cdot 10^{-5}$ | [1/psia] |
| water compressibility | $1.37 \cdot 10^{-5}$ | [1/psia] |
| gas compressibility | 0.0006 | [1/psia] | multiscale calculation and the fine scale simulation. However, as expected the error is very much localized around the boundaries of the dual grids where a reduced system was applied and the error is of a few percentages in most of the domain. Clearly, the quality of this multi-scale solution can be improved when the solution is calculated with improved boundary conditions.

6.2 Waterflood in Linear Geometries

This test case has a two dimensional geometry with 110×60 fine cells. A uniform coarse grid of 22×6 is used for the multi-scale run. The permeability description is taken from the first layer of the Tenth SPE Comparative Solution Project, Christie, M. A. and M. J. Blunt: 2001, *Tenth SPE Comparative Solution Project: A Comparison Of Upscaling Techniques*. SPERE 4(4), 308-17. As shown in FIG. 5A, the permeability varies 10 orders of magnitude. A highly correlated area of low permeability is found in the left-hand-side of the model and that of high permeability in the right-hand side of the model.

The physical properties of the black oil model include three compressible fluid phases, i.e., oil, water and gas. The pressure dependence of the densities is described using formation volume factors, and the phase equilibrium between the oil and gas phases is described using the solution gas-oil-ratio. A typical physical properties of black oil is tabulated in Table 1. For this example the gravity effect is not considered and a higher oil compressibility, $4.8 \cdot 10^{-4}$ for p<$p_b$ is employed, a stringent test of compressibility. As part of the solution gas in oil moves from oil phase to gas phase as pressure decreases, the oil volume decreases as pressure decreases in p<$p_b$. The solution gas is constant above the bubble point pressure, the oil volume decreases as the pressure increases for p>$p_b$.

The model was initialized with oil ($S_o$=1) and constant pressure (4000 psia). At t=0, water is injected at a constant pressure of 5000 psia from the left side; the right boundary is maintained at 2000 psia. This numerical example is a challenging test due to the large pressure drops applied between two boundaries and a large variation in permeability distribution in the model. A constant timestep size, 1 day, was employed for this example.

Figure 5:
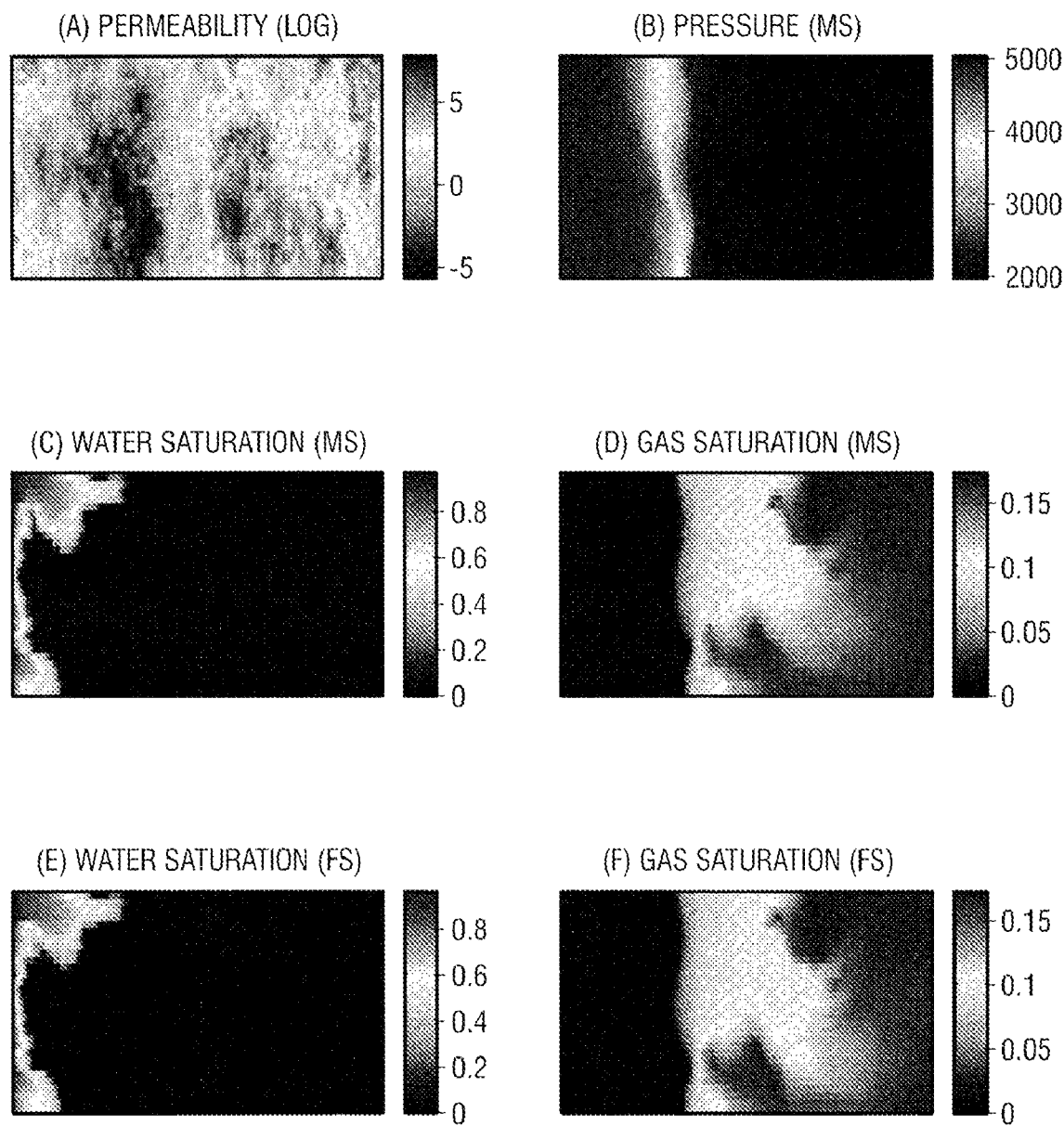
FIGS. 5(a)-(f) show depletion with constant pressure boundary conditions at time=50 days with (a) logarithm of permeability; (b) pressure MSFV; (c) $S_w$ from MSFV; (d) $S_g$ from MSFV; (e) $S_w$ from fine scale simulation; and (f) $S_g$ from fine scale simulation.

In FIG. 5 the results from the MSFV simulator and fine scale reference simulations are depicted at 50 days. Because gas compressibility is two to three orders of magnitude larger than that of either oil or water, a large pressure drop occurs at the boundary of the oil phase above the bubble-point pressure and the mixed (oil and gas) phase below the bubble point. This sharp pressure drop is demonstrated clearly in FIG. 5 (c). In addition, FIG. 5 (c)-(d) indicate that the saturation distributions of water and gas obtained from the MSFV simulation are in excellent agreement with the reference fine scale solutions.

6.3 Two Phase Displacement with Gravity

The accuracy of the black oil MSFV model in the presence of gravity is now assessed with a two phase displacement example. The geometry is a two dimensional 25×25 grid with vertical orientation, the multi-scale coarse grid is 5×5. The permeability is homogeneous, k=100 md, and the porosity is $\phi$=0.2. The physical properties are given in Table I. For a strong depravity effect, we changed the oil density at STC to 0.5 g/cc. The model was initialized at 4000 psia at the top of the model and water was injected at constant rate from the bottom left corner displacing the oil towards the producer located at the top right corner. The average pressure was closely maintained at the initial value.

Figure 6:
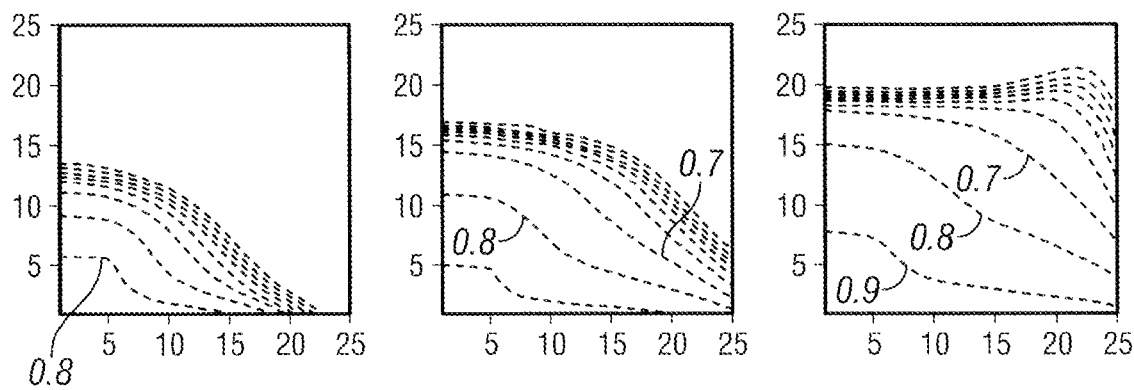
FIG. 6 shows contour lines of water saturation for Example 2 (a) 0.21 PVI; (b) 0.42 PVI; and (c) 0.64 PVI with solid contours represent multi-scale, dashed contours represent fine scale results.

The overall fluid movement is upward. In FIG. 6, water saturation contours are compared between the multi-scale run (solid lines) and the fine scale reference result (dashed) for three different times (or pore volumes injected, PVI). The contours indicate downward movement of the heavier fluid (water). For all three snapshots, the saturation contours from the MSFV approach are in excellent agreement with those from the fine scale reference simulation.

6.4. A Three Dimensional Heterogeneous Model with Two Wells

Figure 7:
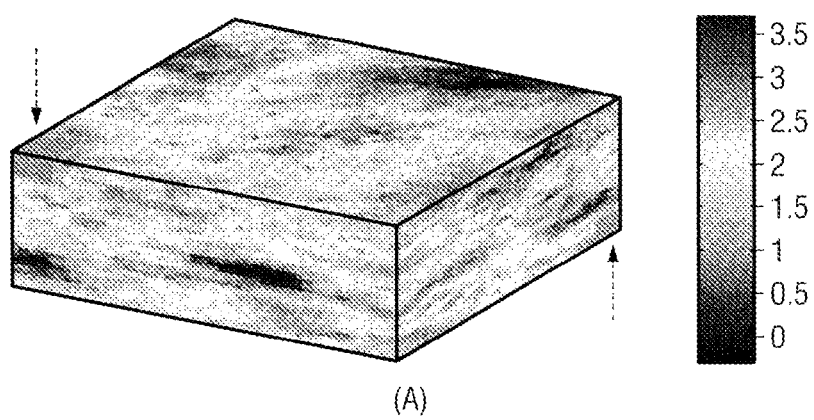
FIG. 7 is a heterogenous model with two wells (Example 3) with (a) log-permeability distributions; and (b) oil saturation, just after breakthrough.
Figure 7:
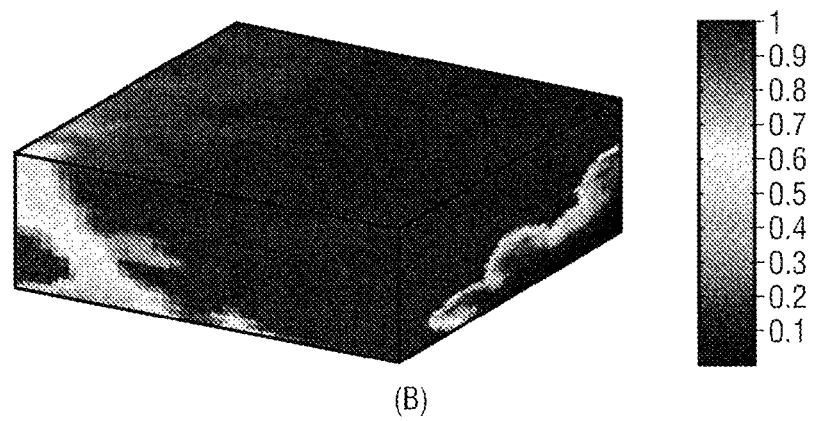

This example employs a three dimensional model with two wells at two opposite corners and heterogeneous permeability. The permeability field is generated by the Sequential Gaussian Simulation Method, Deutsch, C. V. and A. G. Journel: 1998, GSLIB: Geostatistical Software Library and User's Guide. New York: Oxford Univ. Press. The logarithm of permeability has a Gaussian histogram with mean and standard deviation, of 50 md and 1.5, respectively. The variogram is spherical with range of 30 m and 15 m in the directions of 45 degree and 135 degree in the horizontal plane, respectively, and 7.5 m in the vertical direction. The permeability is shown in FIG. 7 (a). The model comprises 150 m×15 m×48 m in physical size and is uniformly discretized using 45×45×30 fine grids. The multi-scale coarse grid is 9×9×6 (uniform.

Figure 8:
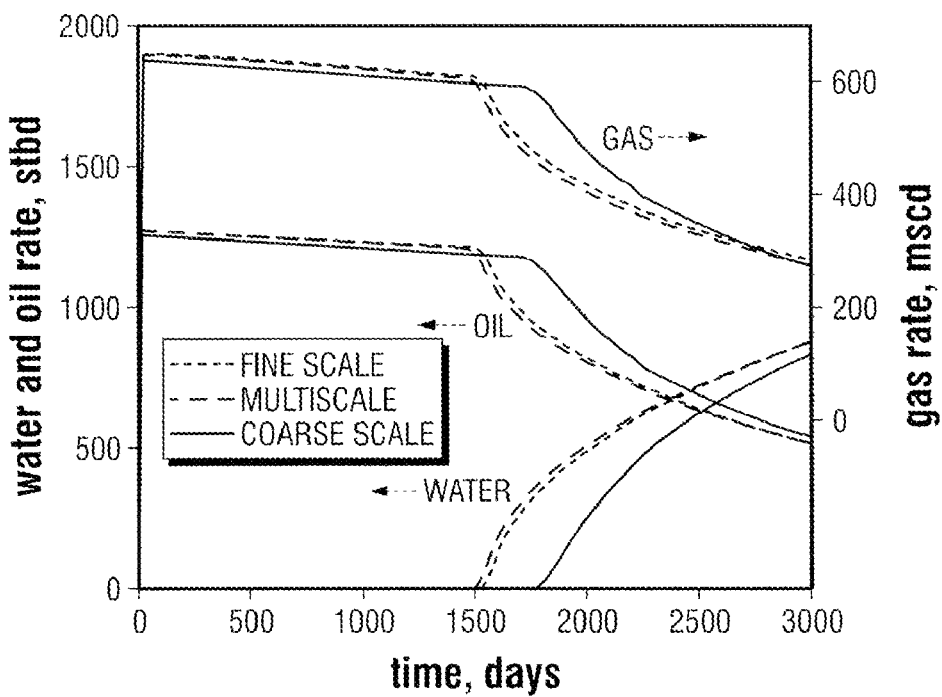
FIG. 8 is a comparison of production rates for Example 3 with multiscale (solid lines); and fine scale references (dashed)

The permeability distribution is shown in FIG. 7 (a). The fluid properties in Table I are also used for this example. The reservoir is initially at gravitational equilibrium with 4000 psia at the top of the model. Water is injected at constant rate from the bottom left corner (cell (1, 1, 1) in coarse grid) displacing the oil toward the producer located at the top right corner (cell (9,9,6) in coarse grid). FIG. 7 (b) shows oil saturation distribution at the water breakthrough. The pressure around the production well is below the bubble point, the solution gas becomes free gas and the gas saturation becomes around 0.2. In FIG. 8 the production rates from MSFV are compared with those from the fine scale reference simulation. The comparison clearly shows that MSFV is very accurate in simulating multiphase flow with gravity and compressibility in heterogeneous media.

An upscaled model is computed for this problem. The basis functions were used for the upscaled transmissibility and computed pressure and saturation in coarse scale without the reconstruction of fine scale solution. The results are also depicted in FIG. 8. Even though the results from the upscaled model was qualitatively following those from the fine scale reference simulation, the upscaled model yielded, due to large numerical dispersion, much less accurate production rates than the multi-scale finite volume method. This numerical example clearly illuminated that the reconstruction of fine scale solution in MSFV is an important step in obtaining a high quality solution.

6.5. A 3-D Field Scale Model with Five Wells

Figure 9:
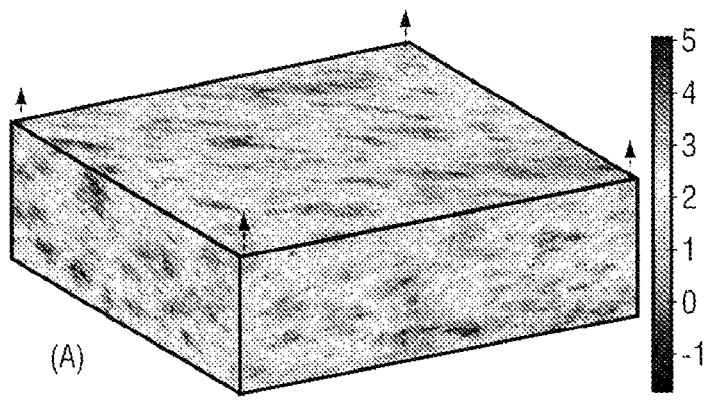
FIG. 9 is a field-scale heterogenous model with five wells (Example 4) with (a) log-permeability distribution; (b) oil saturation just after breakthrough.
Figure 9:
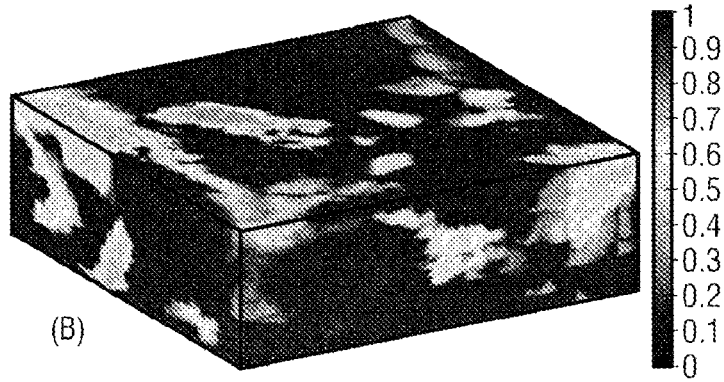
Figure 10:
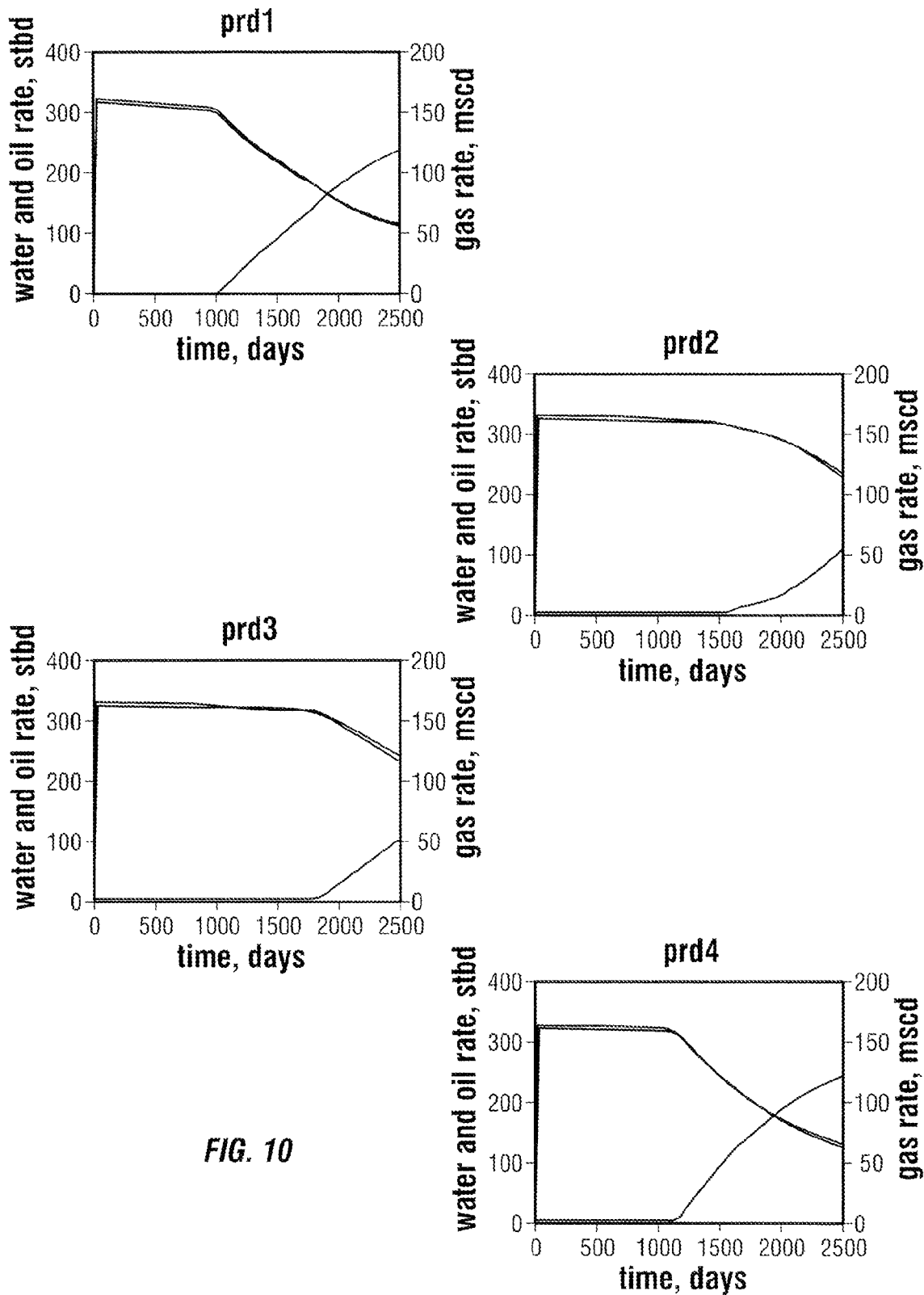
FIG. 10 shows production rates for Example 4.

This example employs a three-dimensional field-scale model with four production wells at the upper four corners and one injection well at the center of the bottom layer. The model consists of more than one million cells (1058851=147×147×49). The permeability field was generated by the Sequential Gaussian Simulation Method Deutsch, C. V. and A. G. Journel: 1998, GSLIB: *Geostatistical Software Library and User's Guide*. New York: Oxford Univ. Press, with the same specifying parameters of example 3i; and the black oil physical properties in Table I were also used for this example. The permeability distribution is shown in FIG. 9 (a). A strong spacial correlation is noted in permeability distribution. Especially the correlated permeability is oriented in the direction along production wells 1 and 3. A uniform coarse grid of 21×21×7 was used that results in a scale-up factor of 343 (=$7^3$) between fine and coarse grids. Water is injected at constant rate from the center of the bottom layer displacing the oil toward the four producers located at the top corners. The model was simulated for 2500 days with the timestep size of 30 days. The oil saturation distribution around the end of simulation was depicted in FIG. 9 (b). The preferred water path from the injection well to the production wells are well established along the correlated orientation of high permeability. In FIG. 10 phase (oil, water and gas) production rates are plotted for the production wells. Due to the strong spacial correlation of heterogeneous permeability, the water breakthrough patterns are very different between wells located along the major correlation direction (wells 1 and 3) and the ones in the minor correlation direction (wells 2 and 4). This non-uniform distribution of saturations is also evident in FIG. 9 (b).

In summary, a multi-scale finite-volume (MSFV) method has been developed for the black oil formulation of multiphase flow and transport in heterogeneous porous media. The black oil formulation, which involves three phase flow with rock and fluid compressibility, gravity, and capillary effects, is widely used in practical field-scale simulations. This approach extends the sequential fully implicit MSFV method to nonlinear three phase compressible flow with mass transfer expressed using solubilities. An operator splitting algorithm is devised to compute the fine scale pressure field. The black oil MSFV method extends the ability to deal with large scale problems of practical interest. The treatment ensures that the nonlinearity due to fluid properties, gratuity, and capillarity can be resolved by a localization assumption for the boundary conditions.

6.6 Three Phase Displacement or Flow Influenced by Gravity

Figure 11:
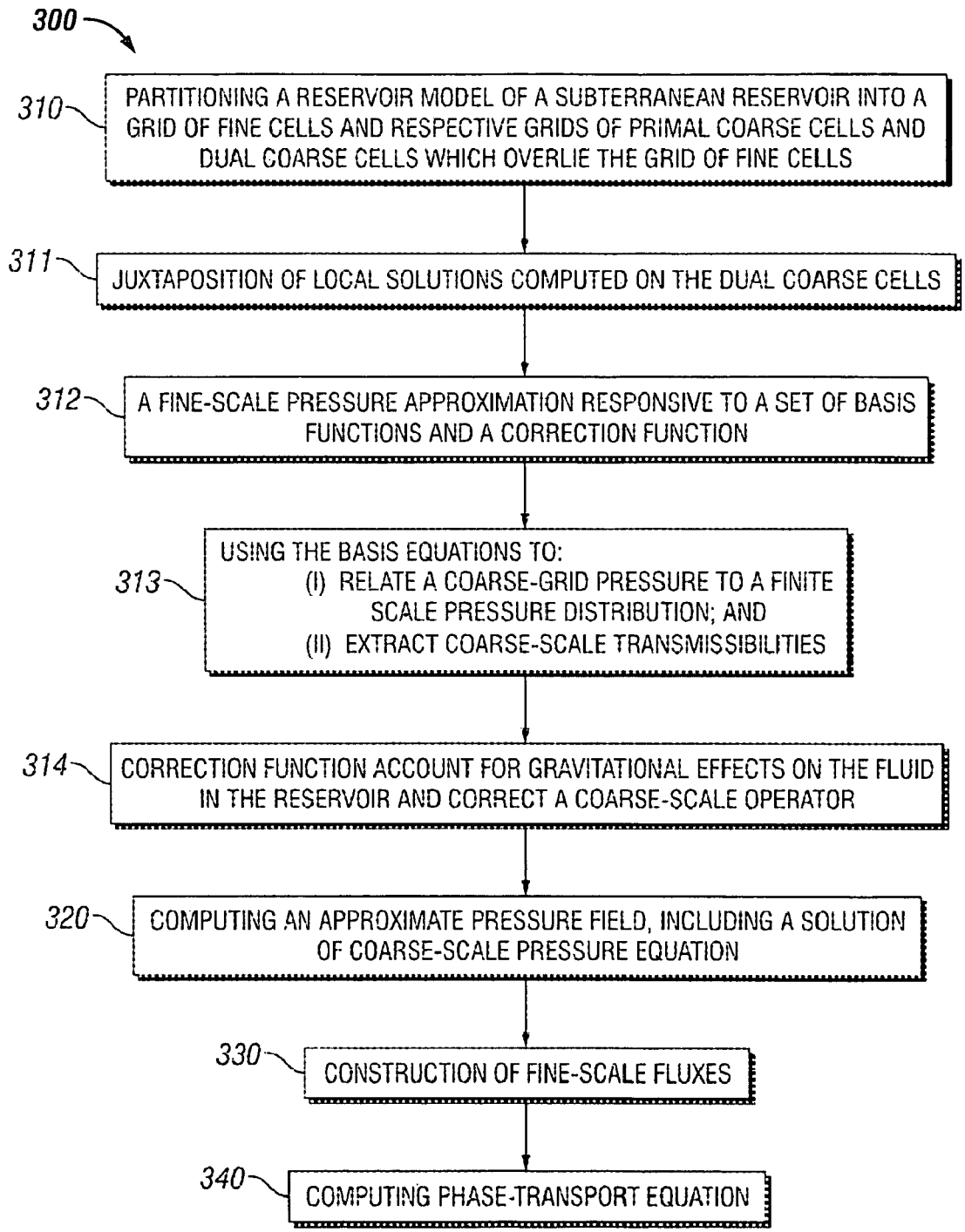
FIG. 11 is a flowchart of a method, practiced in accordance with the another embodiment of present invention, for simulating fluid flow in a subterranean reservoir.

In another embodiment, the Multiscale Finite-Volume (MSFV) method 300 (FIG. 11) has been developed to solve multiphase flow problems on large and highly heterogeneous domains efficiently. It employs an auxiliary coarse grid (FIG. 12), together with its dual, to define and solve a coarse-scale pressure problem. A set of basis functions, which are local solutions on dual cells, is used to interpolate the coarse-grid pressure and obtain the approximate fine-scale pressure distribution. However, when flow takes place in presence of gravity, it is preferable to utilize a correction function, added to the basis-function interpolated pressure, in order to obtain accurate fine-scale approximations. Numerical experiments demonstrate excellent agreement between the MSFV solutions for pressure and saturation and the corresponding fine-scale reference solutions.

6.6.1 Introduction

To model flow and transport in geological porous media efficiently, a number of upscaling techniques have been developed in the past 30 years to coarsen the numerical grid used for the simulations. The price paid to reduce the computational costs is the loss of fine-scale information. To overcome this drawback, several multiscale methods have been recently proposed to model aquifers and reservoirs: the Multiscale Finite-Element Method (Hou and Wu 1997); the Mixed Multiscale Finite-Element Method (Aarnes et al. 2005; Arbogast 2002; Chen and Hou 2003); and the Multiscale Finite-Volume (Jenny et al. 2003). In contrast to upscaling, the focus is not simply on capturing the large-scale behavior of the system, but on solving the problem with the original resolution. The goal is to be as accurate as the fine-scale solution keeping the computational costs low—ideally comparable with traditional upscaling methods.

These methods usually deal with simplified physics (incompressible flow, negligible capillary and gravity effects). With this method, the application of a multiscale algorithm to gravity-driven multiphase flow is show, considering the MSFV method, which in contrast to other methods is based on a finite-volume discretization. This has technical and practical advantages. Indeed, a conservative flux field is obtained by solving a mass balance equation, which facilitates incorporating complex physical processes into the model. Moreover, it follows the main-stream of the currently established simulators in reservoir engineering, which are based on finite-volume discretization. These facts increase the appeal of the method for industrial and practical applications.

The MSFV method was developed to solve elliptic (homogeneous) equations on large and highly heterogeneous domains efficiently and has been applied for incompressible multiphase flow problems with negligible capillary pressure and gravity. The MSFV method has been modified to incorporate additional physics and it has been applied for compressible flow. The modified algorithm 300 consists of three main steps: computation of an approximate pressure solution, which includes the computation of the basis functions to extract coarse-scale effective transmissibilities and the solution of the coarse-scale pressure equation 310; construction of conservative fine-scale fluxes 320; and solution of the transport equations 330. Especially for three phase flow with gravity, it is preferable to modify the pressure approximation in order to treat flow in presence of gravity correctly 340.

6.6.2 Mathematical Model of Multiphase Flow

When considering the flow of three incompressible phases in a rigid porous medium with constant porosity, the mass balance equation of each phase $\alpha=1, 2, 3$ is $$\phi \frac{\partial}{\partial t} S_\alpha + \nabla \cdot u_\alpha + q_\alpha = 0, \tag{54}$$

where $\phi[L^3/L^3]$ is the porosity of the medium; $S_\alpha[L^3/L^3]$ the saturation; and $q_\alpha[1/T]$ the source term (positive when extracted). If we neglect capillary pressure and consider an isotropic porous medium, the volumetric flux per unit area, $u_\alpha[L/T]$, is given by the generalized Darcy's law, i.e., $$u_\alpha = -\lambda_\alpha k(\nabla p - \rho_\alpha g) \tag{55}$$

where $\lambda_\alpha$ is the $\alpha$-phase relative mobility; $k[L^2]$ the intrinsic permeability, which is fluid independent; $p[M/LT^2]$ the pressure; $\rho_\alpha[M/L^3]$ the density; and $g[L/T^2]$ the gravity acceleration vector.

Summing up Eqs. (54), defining the total velocity, $u=\Sigma_\alpha u_\alpha$, and the total source term, $q=\Sigma_\alpha q_\alpha$, and noting that $\Sigma_\alpha S_\alpha=1$, we obtain $$\nabla \cdot u + q = 0 \tag{56}$$

According to Eq. (55), the total velocity can be written as $$u = -\lambda k(\nabla p - G) \tag{57}$$

where $$G = g \frac{\Sigma}{\alpha} f_\alpha \rho_\alpha \tag{58}$$

$[M/T^2L^2]$, is the modified gravity; $\lambda=\Sigma_\alpha \lambda_\alpha$ the total mobility; and $f_\alpha=\lambda_\alpha/\lambda$, the fractional flow function of the $\alpha$-phase. Once Eq. (56) has been solved for the pressure, p, the velocities of two phases can be computed and used in the two corresponding transport equations, which have the form of Eq. (54). The saturation of the third phase can be obtained from the constraint $\Sigma_\alpha S_\alpha=1$.

6.6.3 Finite-Volume Discretization

Given a grid with M nodes and N cells, which defines a partition of the domain, $\Omega$, into N control volumes, $\Omega_i \in [1N]$ we can derive a set of discrete mass-balance equation by integrating Eq. (56) over each control volume i.e. $\int_{\Omega_i} \{\nabla \cdot u + q\} d\chi = 0$. Neglecting the source term, using Eq. (57), and applying Gauss' theorem (or divergence theorem), we can write $$\sum_j \int \partial \Omega_{ij} \lambda k \nabla p \cdot \eta d\Gamma = \sum_j \int \partial \Omega_{ij} \lambda k G \cdot \eta d\Gamma \tag{59}$$

where $\partial \Omega_{ij} = \partial \Omega_i \cap \partial \Omega_j$ is the interface between two cells, $\Omega_i$ and $\Omega_j$, the unit vector orthogonal to $\partial \Omega_{ij}$ pointing from $\Omega_i$ to $\Omega_j$. In Eq. (6) a choice has to be made in order to relate the continuous pressure gradient, $\nabla p$, to the discrete potential drop between the two cells, $p_i - p_j$. In the standard cell-centered finite-volume scheme, a piecewise linear interpolation is used and flux continuity is enforced at the interface; in the MSFV method localized fine-scale solutions of the pressure equation are used as pressure interpolators.

6.6.4 The MSFV Method 300

Figure 12:
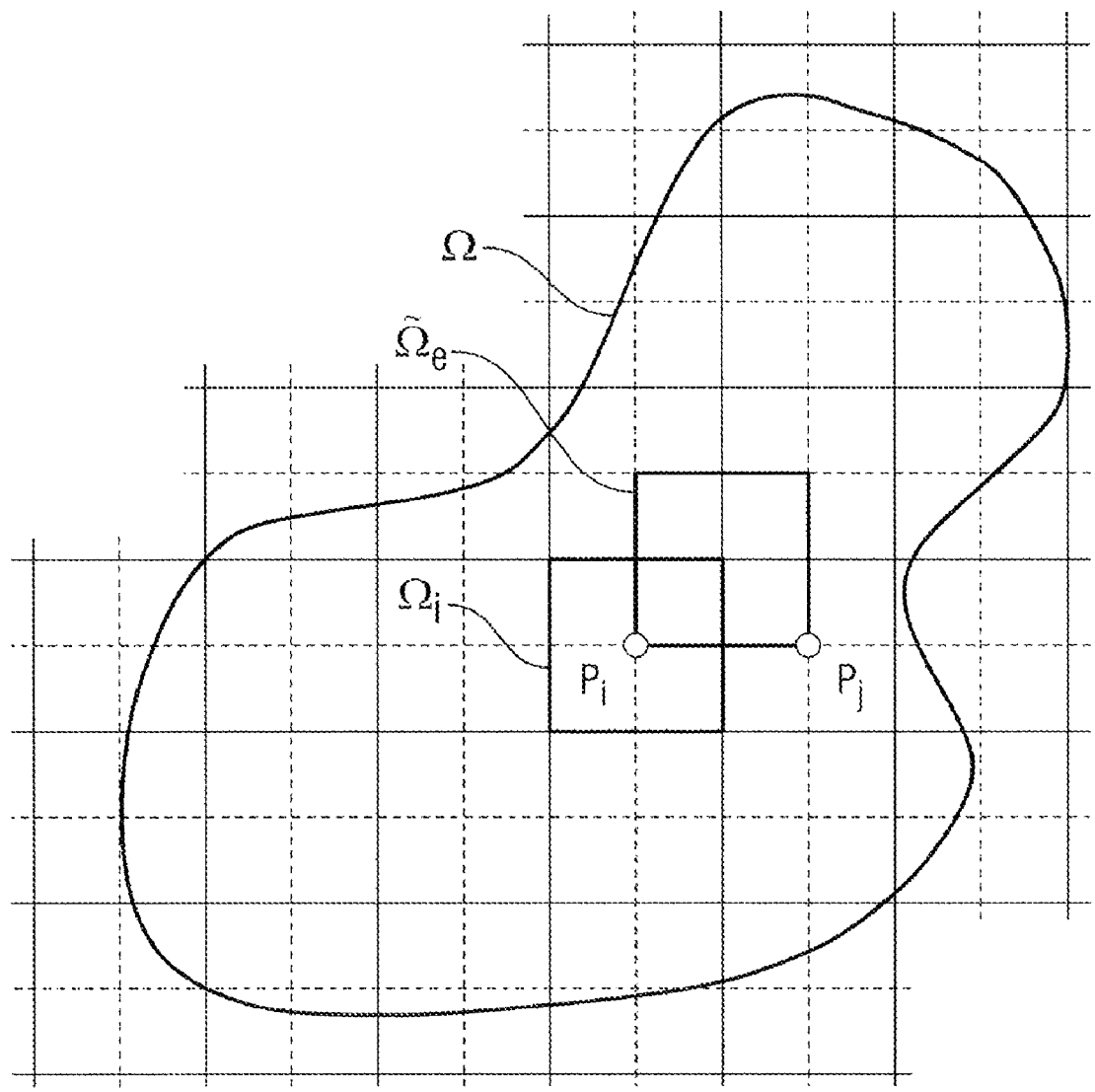
FIG. 12 is a global problem domain partitioned into a primal or course grid (solid lines) together with its dual coarse grid (dashed lines).

FIG. 12 illustrates a course grid (solid lines) together with its dual grid (dashed lines). Referring to FIG. 12, in the MSFV method an auxiliary coarse grid with M nodes and N cells is constructed, which defines a partition, $\Omega_{i \in [1,N]}$ of the domain $\Omega$. A dual coarse grid is constructed such that each dual coarse cell, $\Omega^{e \in [1,N]}$, contains exactly one node of the coarse grid in its interior. The dual coarse grid has N nodes, $\chi_{i \in [1,N]}$, exactly one in the interior of each coarse cell.

The modified MSFV method 300, consists of three main steps: computation of an approximate pressure field 320, which includes the solution of a coarse-scale pressure equation; construction of conservative fine-scale fluxes 330; and solution of the phase-transport equations 340. The pressure approximation consists of a juxtaposition of local solutions computed on the dual cells 311. To compute the fine-scale pressure approximation, a set of basis functions and a correction function are employed 312. The basis functions, which are local solutions of the elliptic homogeneous equation, are used to relate the coarse-grid pressure to the fine-scale pressure distribution and to extract the coarse-scale transmissibilities 313. The correction function, which is independent of the coarse-scale pressure, is used to account for the gravity effects and correct the coarse-scale operator 314.

Once the approximate pressure is obtained, the fluxes induced at the coarse-cell boundaries are extracted and used as Neumann boundary conditions for local problems (one in each coarse cell), which are solved to compute a conservative fine-scale flow field. Therefore, the flux approximation is defined as a juxtaposition of local solutions computed on the coarse cells. Mass conservation is guaranteed by the fact that fluxes are continuous at the coarse-cell interfaces since adjacent cells share the same flux boundary conditions (with opposite sign).

The conservative total-flux field is used in the phase-transport equations, which are solved by a Schwarz's overlapping method using an implicit scheme locally within the coarse cells. Since mobility depends on saturation, basis functions have to be updated. In order to keep the MSFV method efficient it is crucial that the basis functions are update adaptively only in regions where mobility changes exceed a given threshold. Like this most functions can be reused for the successive step. In the following, see describe how the pressure approximation is constructed for a more comprehensive description of the method including the adaptively criterion to update the basis and correction functions; the construction of the flux approximation; the solution of the phase transport equations; and the coupling between pressure and saturation equations.

Finescale pressure approximation. The MSFV method relies on approximating the fine-scale pressure by a juxtaposition of localized solutions computed in the dual cells, $p|\tilde{\Omega}e$, and on the representation of these solutions as $$p|\tilde{\Omega}e = \sum_j \tilde{\varphi}_j^e p_j + \tilde{\varphi}_*^e, \quad (60)$$

where the basis functions, $\tilde{\varphi}_j^e$, are local solutions of $$\begin{cases} \nabla \cdot \lambda k \nabla \tilde{\varphi}_j^e = 0 \text{ on } \tilde{\Omega}^e \\ \nabla_\perp \cdot \lambda k \nabla \tilde{\varphi}_j^e = 0 \text{ on } \partial\tilde{\Omega}^e, \\ \tilde{\varphi}_j^e(x_i) = \delta_{ij} \end{cases} \quad (61)$$

and the correction function, $\tilde{\varphi}_*^e$ of $$\begin{cases} \nabla \cdot \lambda k (\nabla \tilde{\varphi}_*^e - G) = 0 \text{ on } \tilde{\Omega}^e \\ \nabla_\perp \cdot \lambda k (\nabla \tilde{\varphi}_*^e - G) = 0 \text{ on } \partial\tilde{\Omega}^e. \\ \tilde{\varphi}_*^e(x_i) = 0 \end{cases} \quad (62)$$

Note that the boundary condition assigned on $\partial\tilde{\Omega}^e$ is equivalent to require that $$\nabla\perp \cdot u = 0 \quad (63)$$

where the subscript $\perp$ denotes the vector component perpendicular to $\partial\tilde{\Omega}^e$, and $$p(x_i) = p_j \quad (64)$$

This boundary condition proved to provide accurate results for a large set of numerical test cases (Jenny et al. 2003; Jenny et al. 2004; Lunati and Jenny 2006a).

Since the velocity is divergence free and $\nabla \cdot u = \nabla_\perp \cdot u + \nabla|_{-u}$, Eq. (63) is equivalent to assign the solution of the reduce problem $\nabla\|\cdot u = 0$ as Dirichlet boundary conditions on $\partial\tilde{\Omega}^e$, where the subscript $|$ denotes the vector component parallel to $\partial\tilde{\Omega}^e$.

Coarse-scale problem. The coarse-scale pressure equation can be obtained inserting the approximate pressure. Eq. (60), into Eq. (59). This yields the following set of discrete coarse-cell mass-balance equations:

$$\sum_j T_{ij} p_j = \sum_e \int_{\partial\Omega_i \cap \Omega^e} \lambda k \nabla \tilde{\varphi}_*^e \cdot \eta ds - \int_{\partial\Omega_i} \lambda k G \cdot \eta ds \ i \in [1, N] \quad (65)$$

where the transmissibilities, $$T_{ij} = -\sum_e \int_{\partial\Omega_i \cap \Omega^e} \lambda k \nabla \tilde{\varphi}_j^e \cdot \eta ds, \quad (66)$$

are defined as in the case without gravity effects. The terms on the right-hand side of Eq. (65) represent two surface source terms on $\partial\Omega_i$. Since the coarse-scale operator, $T_{ij}$, does not include gravity effects, it yields fluxes across $\partial\Omega_i$ that are incorrect. The first term on the right-hand side of Eq. (65) represents a correction to these in inaccurate fluxes and can be regarded as a local correction to the coarse-scale operator, $T_{ij}$, independent of the coarse-scale pressure.

6.6.5 Numerical Tests

In this section the accuracy of the MSFV method for density-driven flow is investigated by comparison with a fine-scale reference solution. We consider a 1D counter-current flow problem in a homogeneous permeability field and a 2D lock-exchange problem in a heterogeneous permeability field. In both cases no-flow conditions apply to all boundaries.

TABLE 1

Properties of the phases used for the numerical simulations

|  | μa [Pa s] | p_a [kg/m³] |
|---|---|---|
| water | $10^{-3}$ | 1000 |
| brine | $10^{-3}$ | 1100 |
| heavy oil | $10^{-2}$ | 900 |
| light oil | $10^{-2}$ | 500 |

Counter-current flow. We consider a three-phase counter-current flow in an homogeneous permeability field. Initially, the lower part of the domain is filled with 50% heavy oil and 50% brine, and the upper part with 100% water. Quadratic mobilities are assumed for all phases; phase viscosities and densities are given in Table 1. At time zero brine and oil begin to separate due to buoyancy effects. When the brine saturation decreases at the water interface, the water becomes heavier than the "mixture" below and starts moving downwards while oil continues flowing upwards. This numerical experiment allows having in a single test a stable interface (water/brine), an unstable interface (water/oil), and phase separation.

Figure 13:
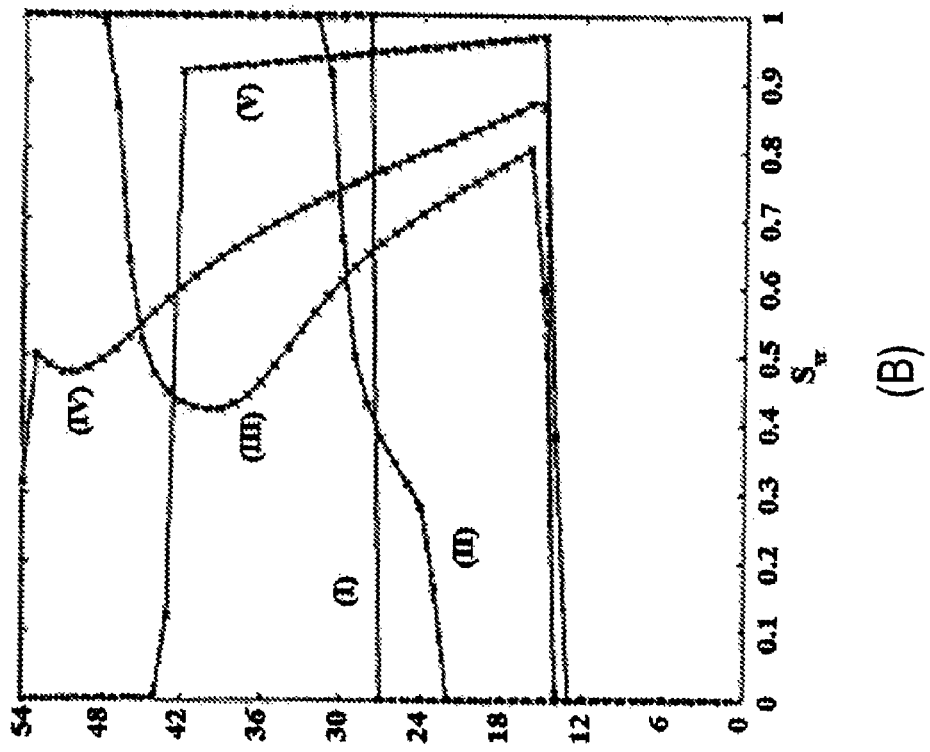
FIGS. 13A-13B illustrate vertical profiles of oil saturation and water saturation for three-phase counter-current flow in an homogeneous permeability field.
Figure 13:
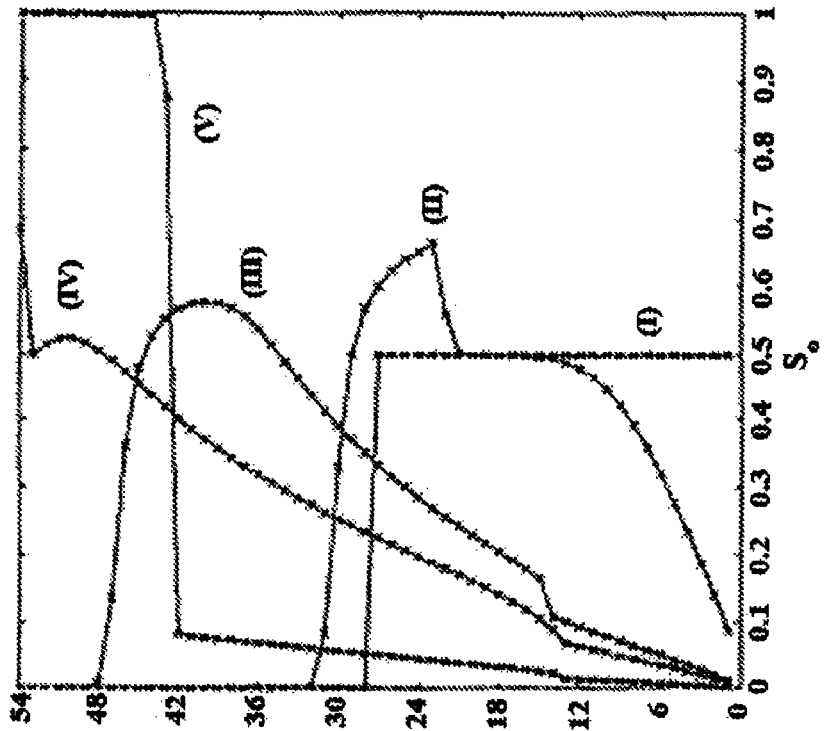

FIG. 13 compares the evolution of the vertical profiles of oil saturation (FIG. 13A) and water saturation (FIG. 13B) obtained with the MSFV method with the corresponding fine-scale reference solutions. The numerical solutions are computed on a 1D domain of size L, which is discretized into 54 fine cells. The coarse grid used for the MSFV method consists of 9 cells. It can be observed that solutions are almost identical.

Lock-exchange problem. We consider a three phase system consisting of water, light oil and a dummy phase, which has the same properties of the oil phase. Initially, water occupies the left half of the domain, while the right part is filled with oil. Due to the density difference, recirculation is induced. Here, in contrast to the counter-current flow problem, gravity significantly contributes to the total velocity and therefore an accurate global pressure information is needed to correctly capture the flow induced in the horizontal direction. The saturation of the dummy phase, which is initially not present in the system, is obtained from the constrained $\Sigma_\alpha S_\alpha$ is used to check material-balance: the error has to remain smaller than the specified saturation-error tolerance. Quadratic mobilities are assumed for all phases; phase viscosities and densities are given in Table 1.

Figure 3:
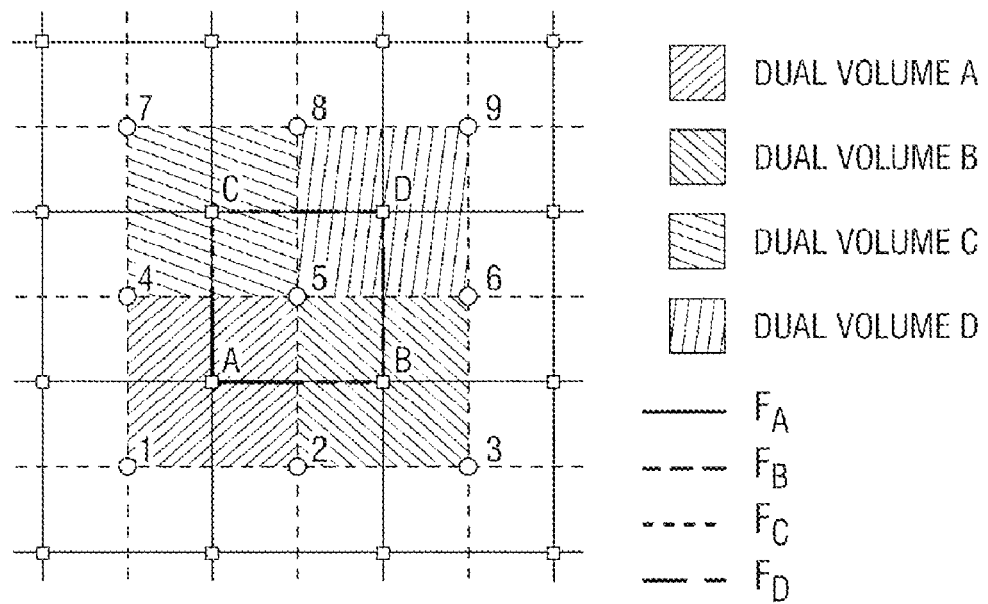
FIG. 3 shows a coarse grid with nine adjacent coarse volumes (solid lines). Also shown is a corresponding dual grid (dashed lines). Four adjacent coarse dual control volumes comprise the boundary conditions for the coarse grid of a cell 5.

The numerical solutions are computed on a 2D domain of size L×L, which is discretized into 54×54 fine cells. The coarse grid used for the MSFV method consists of 9×9 cells. The geometric mean of the heterogeneous permeability field (FIG. 13D) is $k_g = 1.3 \cdot 10^{-9}$ m$^2$ and the variance of the log-normal permeability is $\sigma_{ln\ k}^2 = 2.5$. FIGS. 13A-13C illustrate water-phase saturation contour lines (0.001, 0.25, 0.5, 0.75, and 0.999) at three different times, with the fine-scale solution (solid contours) and the MSFV solution (dashed contours). FIG. 13D) illustrates the natural logarithm of the heterogeneous permeability field. In FIG. 3, the evolution of the saturation distribution obtained with the IVISFV method is compared with the fine-scale reference solutions. Shown are water-saturation contour lines at three different times. Note the sharp drainage front (oil invasion) and the expansion wave behind the wetting front (water invasion) due to viscosity difference. The two solutions are in excellent agreement even after large simulation times, which proves that the velocities of the two invading fronts are accurately captured by the MSFV method. The saturation of the dummy phase always remains smaller that the error tolerance of the phase-transport equations.

An accurate treatment of density-driven flow in the IVISFV method has been achieved adding a correction function to the basis-function interpolated pressure. This correction yields very accurate fine-scale pressure fields. The numerical experiments performed for density-driven flow problems (counter-current flow and a lockexchange) demonstrate that the MSFV solutions for pressure and saturation are in excellent agreement with the corresponding fine-scale reference solutions.

While in the foregoing, specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

APPENDIX A

I. Flow Problem

A. One Phase Flow

Fluid flow in a porous media can be described by the elliptic problem:

$$\nabla \cdot (\lambda \cdot \nabla p) = f \text{ on } \Omega \quad (A1)$$

where p is the pressure, $\lambda$ is the mobility coefficient (permeability, K, divided by fluid viscosity $\mu$) and $\Omega$ is a volume or region of a subsurface which is to be simulated. A source term f represents wells, and in the compressible case, time derivatives. Permeability heterogeneity is a dominant factor in dictating the flow behavior in natural porous formations. The heterogeneity of permeability K is usually represented as a complex multi-scale function of space. Moreover, permeability K tends to be a highly discontinuous full tensor. Resolving the spatial correlation structures and capturing the variability of permeability requires a highly detailed reservoir description.

The velocity u of fluid flow is related to the pressure field through Darcy's law:

$$u = -\lambda \cdot \nabla p. \quad (A2)$$

On the boundary of a volume, $\partial \Omega$, the flux q=u·v is specified, where v is the boundary unit normal vector pointing outward. Equations (1) and (2) describe incompressible flow in a porous media. These equations apply for both single and multi-phase flows when appropriate interpretations of the mobility coefficient $\lambda$ and velocity u are made. This elliptic problem is a simple yet representative, description of the type of systems that should be handled efficiently by a subsurface flow simulator. Moreover, the ability to handle this limiting case of incompressible flow ensures that compressible systems can be treated as a subset.

B. Two Phase Flow

The flow of two incompressible phases in a heterogeneous domain may be mathematical described by the following:

$$\Phi \frac{\partial S_o}{\partial t} - \frac{\partial}{\partial x_i}\left(k \frac{k_{ro}}{\mu_o} \frac{\partial p}{\partial x_i}\right) = -q_o \quad (A3)$$

$$\Phi \frac{\partial S_w}{\partial t} - \frac{\partial}{\partial x_i}\left(k \frac{k_{rw}}{\mu_w} \frac{\partial p}{\partial x_i}\right) = -q_w$$

on a volume $\Omega$, where p is the pressure, $S_{o,w}$ are the saturations (the subscripts o and w stand for oil and water, respectively) with $0 \leq S_{o,w} \leq 1$ and $S_o + S_w \equiv 1$, k is the heterogeneous permeability, $k_{r_{o,w}}$ are the relative permeabilities (which are functions of $S_{o,w}$), $\mu_{o,w}$ the viscosities and $q_{o,w}$ are source terms which represent the wells. The system assumes that capillary pressure and gravity are negligible. Equivalently, system (3) can be written as:

$$-\nabla \cdot u = q_o + q_w \quad (A4)$$

$$\Phi \frac{\partial S_o}{\partial t} + \nabla \cdot \left(\frac{k_o}{k_o + k_w} u\right) = -q_o \text{ on } \Omega \text{ with} \quad (A5)$$

$$u = -\lambda \nabla p. \quad (A6)$$

and the total mobility $$\lambda = k(k_o + k_w), \quad (A7)$$

where $k_j \equiv k_o / \mu_j$ for $j \in \{o, w\}$.

Equation (4) is known as the "pressure equation" and equation (5) as the "hyperbolic transport equation." Again equations (4) and (5) are a representative description of the type of systems that should be handled efficiently by a subsurface flow simulator. Such flow simulators and techniques employed to simulate flow, are well known to those skilled in the art and are described in publications such as Petroleum Reservoir Simulation, K. Aziz and A. Settari, Stanford Bookstore Custom Publishing, 1999.

II. Multi-Scale Finite-Volume (MSFV) Method

A. MSFV Method for One Phase Flow

1. Finite-Volume Method

A cell centered finite-volume method will now be briefly described. To solve the problem of equation (1), the overall domain or volume $\Omega$ is partitioned into smaller volumes $\{\overline{\Omega}_i\}$. A finite-volume solution then satisfies $$\int_{\overline{\Omega}_i} \nabla \cdot u \, d\Omega = \int_{\partial \overline{\Omega}_i} u \cdot \overline{v} \, d\Gamma = -\int_{\overline{\Omega}_i} f \, d\Omega \qquad (A8)$$

for each control volume $\overline{\Omega}_i$, where $\overline{v}$ is the unit normal vector of the volume boundary $\partial \overline{\Omega}_i$ pointing outward. The challenge is to find a good approximation for $u \cdot \overline{v}$ at $\partial \overline{\Omega}_i$. In general, the flux is expressed as:

$$u \cdot \overline{v} = \sum_{k=1}^{n} T^k \overline{p}^k. \qquad (A9)$$

Equation (9) is a linear combination of the pressure values, $\overline{p}$, in the volumes $\{\overline{\Omega}_i\}$ of the domain $\Omega$. The total number of volumes is n and $T^k$ denotes transmissibility between volumes $\{\overline{\Omega}_i\}$. By definition, the fluxes of equation (9) are continuous across the interfaces of the volumes $\{\overline{\Omega}_i\}$ and, as a result, the finite-volume method is conservative.

2. Construction of the Effective Transmissibilities

The MSFV method results in multi-point stencils for coarse-scale fluxes. For the following description, an orthogonal 2D grid 20 of grid cells 22 is used, as shown in FIG. A1. An underlying fine grid 24 of fine grid cells 26 contains the fine-scale permeability K information. To compute the transmissibilities T between coarse grid cells 22, a dual coarse grid 30 of dual coarse control volumes 32 is used. A control volume 32 of the dual grid 30, $\tilde{\Omega}$, is constructed by connecting the mid-points of four adjacent coarse grid cells 22. To relate the fluxes across the coarse grid cell interfaces 34 which lie inside a particular control volume 32, or Q, to the finite-volume pressures $\overline{p}^k$ (k=1,4) in the four adjacent coarse grid cells 22, a local elliptical problem in the preferred embodiment is defined as $$\nabla \cdot (\lambda \cdot \nabla p) = 0 \text{ on } \tilde{\Omega}. \qquad (A10)$$

For one skilled in the art, the method can easily be adapted to use a local parabolic problem.

For an elliptic problem, Dirichlet or Neumann boundary conditions are to be specified on boundary $\partial \tilde{\Omega}$. Ideally, the imposed boundary conditions should approximate the true flow conditions experienced by the sub-domain in the full system. These boundary conditions can be time and flow, dependent. Since the sub-domain is embedded in the whole system, Wallstrom et al. (T. C. Wallstrom, T. Y. Hou, M. A Christie, L. J. Durlofsky, and D. H. Sharp, Application of a new two-phase upscaling technique to realistic reservoir cross sections, SPE 51939, presented at the SPE Symposium on Reservoir Simulation, Houston, 1999) found that a constant pressure condition at the sub-domain boundary tends to overestimate flow contributions from high permeability areas. If the correlation length of permeability is not much larger than the grid size, the flow contribution from high permeability areas is not proportional to the nominal permeability ratio. The transmissibility between two cells is a harmonic mean that is closer to the lower permeability. As a result, uniform flux conditions along the boundary often yield much better numerical results for a sub-domain problem than linear or constant pressure conditions.

Hou and Wu (T. Hou and W. H. Wu, A multi-scale finite element method for elliptic problems in composite materials and porous media. J. Comp. Phys, 134:169-189, 1997) also proposed solving a reduced problem $$\frac{\partial}{\partial x_t}\left(\lambda_{ij} \frac{\partial p}{\partial x_j}\right)_t = 0, \qquad (A11)$$

to specify the boundary conditions for the local problem. The subscript t denotes the component parallel to the boundary of the dual coarse control volume 32 or $\partial \tilde{\Omega}$. For equation (11) and for the following part of this specification, Einstein summation convention will be used. The elliptic problem on a control volume Q with boundary conditions of equation (11) on $\partial \tilde{\Omega}$ can be solved by any appropriate numerical method. In order to obtain a pressure solution that depends linearly on the pressures $\overline{p}^k$ (j=1,4) this preferred embodiment solves four elliptic problems, one for each cell-center pressure. For instance, to get the solution for the pressure $\overline{p}^1$ in the coarse grid cell having node 1 at its center, $\overline{p}^k = \delta_{1k}$ is set. The four solutions provide the dual basis functions $\tilde{\Phi}^k$ (k=1,4) in control volume $\tilde{\Omega}$, and the pressure solution of the local elliptic problem in a control volume $\tilde{\Omega}$ is the linear combination $$p = \sum_{k=1}^{4} \overline{p}^k \tilde{\Phi}^k. \qquad (A12)$$

Accordingly, the flux q across the grid cell interfaces can be written as a linear combination $$q = \sum_{k=1}^{4} \overline{p}^k q^k, \qquad (A13)$$

where $q^k$ (k=1,4) are the flux contributions from the corresponding dual basis functions, given all $\tilde{\Phi}^k$ (k=1,4) from all control volumes $\tilde{\Omega}$. The effective transmissibilities T are computed, which can be used for finite-volume simulations, by assembling the flux contributions, in the preferred embodiment integral flux contributions across the cell interfaces 34.

Note that the domain $\tilde{\Omega}$ can have any fine-scale distribution of mobility coefficients $\lambda$. Of course the boundary condition given by equation (11) is an approximation that allows one to decouple the local problems. The MSFV and global fine-scale solutions are identical, only if equation (11) happens to capture the exact fine-scale pressure solution. However, numerical experiments have been performed which indicate that equation (11) is an excellent approximation of the boundary condition.

Although the MSFV approach is a finite-volume method, it resembles the multi-scale finite-element method of Wu and Hou, briefly mentioned above. The construction of the dual basis functions is similar, though in the present MSFV method they are represented on the dual coarse grid rather than on the boundary of a finite element. A significant difference is that the present MISFIT method is a cell-centered finite-volume method and is conservative. On the other hand, the mass matrix in the multi-scale finite-element method is constructed based on a variational principle and does not ensure local conservation. In the next section, the importance is illustrated of a fine-scale velocity field that is conservative.

3. Reconstruction of a Conservative Fine-Scale Velocity Field

Fluxes across the coarse cell interfaces 34 can be accurately computed by multi-scale transmissibilities T. In some cases, it is interesting to accurately represent the small-scale velocities u (e.g. to predict the distribution of solute transported by a fluid). A straightforward approach might appear to be to use the dual basis functions $\tilde{\Phi}$ of equation (12). However, then the reconstructed fine-scale velocity field is, in general, discontinuous at the cell interfaces of the dual grid 30. Therefore, large errors can occur in the divergence field and local mass balance is violated. Note that mass conservation is always satisfied for the coarse solution using the present MSFV method.

The construction of a second set of local fine-scale basis functions $\Phi$ will now be described which is fully consistent with the fluxes q across the cell interfaces given by the dual basis functions $\tilde{\Phi}$. This second set of fine-scale basis functions $\Phi$ allows a conservative fine-scale velocity field to be reconstructed.

FIG. A2 shows a coarse grid 20 with nine adjacent grid cells 22 and a corresponding dual grid 30 of dual coarse control volumes 32 or $\tilde{\Omega}$. For indexing purposes, these particular cells and corresponding dual volumes shall now be identified with numerals "1-9," and letters "A-D" at their respective centers. Also shown is the underlying fine grid 24 of fine grid cells 26. The coarse grid, having the nine adjacent coarse cells 1-9, is shown in bold solid lines. The corresponding dual grid 30 of dual coarse control volumes A-D are depicted with hold dashed lines. The underlying fine grid 24 of fine grid cells 26 is shown with thin dotted lines.

To explain the reconstruction of the fine-scale velocity, the mass balance of the center grid cell 5 is examined. The coarse scale pressure solution, together with the dual basis functions $\tilde{\Phi}$, provides the fine-scale fluxes q across the interfaces of coarse cell 5.

To obtain a proper representation of the fine-scale velocity field in coarse cell 5, (i) the fine-scale fluxes across an interface of coarse cell 5 must match, and (ii) the divergence of the fine-scale velocity field within the coarse volume satisfies $$\nabla \cdot u = \frac{\int_{\partial \tilde{\Omega}_5} q d\Gamma}{\int_{\tilde{\Omega}_5} d\Omega}, \tag{A14}$$

construction of the fine-scale basis functions $\Phi^i$ will be described. Each coarse cell pressure $\bar{p}(i=1,9)$ contributes to the fine-scale flux q. For example, let the contribution of the pressure in cell 2 to the flux q in grid cell 5 be $q^{(2)}$. Note that $q^{(2)}$ is composed of contributions $q_A^{(2)}$ and $q_B^{(2)}$ coming from the dual basis functions associated with node 2 of volume A and volume B, respectively. To compute the fine-scale basis function $\Phi^i$ associated with the pressure in a coarse cell i, $\bar{p}^j = \delta_{ij}$ is set, and the pressure field is constructed according to the following equation $$p = \sum_{k \in \{A,B,C,D\}} \sum_{j=1}^{9} \bar{p}^j \tilde{\Phi}_k^j. \tag{A15}$$

The fine-scale fluxes q are computed from the pressure field. These fluxes provide the proper boundary condition for computing the fine-scale basis function $\Phi^i$. To solve the elliptic problem $$\nabla \cdot (\lambda \cdot \nabla p) = f' \text{ on } \overline{\Omega}_5 \tag{A16}$$

with the boundary conditions described above, solvability must be ensured. This is achieved by setting $$f' = \frac{\int_{\partial \tilde{\Omega}_5} q d\Gamma}{\int_{\tilde{\Omega}_5} d\Omega}, \tag{A17}$$

which is an equally distributed source term within $\overline{\Omega}_5$. Finally, the solution of the elliptic problem, (16) and (17), is the fine-scale basis function $\Phi^i$ for coarse cell 5 associated with the pressure in volume i. The small-scale velocity field is extracted from the superposition $$p = \sum_{j=1}^{9} \bar{p}^j \Phi_5^j. \tag{A18}$$

For incompressible flow, this velocity field is divergence free everywhere. Computing the fine-scale basis functions $\Phi^i$ requires solving nine small elliptic problems, which are of the same size as those for the transmissibility calculations. Note that this step is a preprocessing step and has to be done only once. Furthermore, the construction of the fine-scale basis functions $\Phi^i$ is independent and therefore well suited for parallel computation. The reconstruction of the fine-scale velocity field is a simple superposition and is ideally performed only in regions of interest.

Alternatively, a conservative fine-scale velocity field may also be constructed directly in place. This construction may be performed as follows: (i) compute the fine-scale fluxes across the coarse cell interfaces using the dual basis functions with the pressures for the coarse cells; (ii) solve a pressure equation on each of the coarse cells using the fine-scale fluxes computed in step (i) as boundary conditions to obtain fine-scale pressures (iii) compute the fine-scale velocity field from Darcy's law using the fine-scale pressures obtained in step (ii) with the underlying fine-scale permeability. The pressure solution of step (ii) may be performed on a system with larger support (e.g., by over-sampling around the coarse cell).

A conservative fine-scale velocity field may also be constructed directly in place as follows: (1) Compute the fluxes across the coarse cell boundaries using the dual basis functions with the coarse pressures. (2) Solve the pressure equation on each of the coarse cells using the fine-scale fluxes computed in Step 1 as boundary conditions. (3) Compute the fine-scale velocity field from Darcy's law using the fine-scale pressure obtained in Step 2 with the under-lying fine-scale permeability. The pressure solution of Step 2 may be performed on a system with larger support (e.g., by over-sampling around the coarse cell).

What is claimed is:

1. A method for simulating the properties of a fluid-containing subterranean reservoir, the method comprising:

(a) providing a reservoir model of a subterranean reservoir partitioned into a grid of fine cells and respective grids of primal coarse cells and dual coarse cells which overlie the grid of fine cells;

(b) constructing a first pressure equation comprising 1) a homogenous equation component $p_h$; 2) a gravity and capillarity equation component $p_g$; and 3) an inhomogenous equation component $p_p$ associated with at least one of sources and sinks and accumulation;
  (i) solving the homogenous equation component $p_h$ to obtain dual basis functions utilizing local boundary conditions on the dual coarse cells;
  (ii) solving the gravity and capillarity equation component $p_g$ to arrive at a summation of products of primal coarse cell pressures and dual basis functions and a correction term;
  (iii) solving the inhomogenous equation component $p_p$ to arrive at primal coarse cell pressure equations utilizing the basis functions in conjunction with the correction term;
(c) solving the primal coarse cell pressure equations for primal coarse cell pressures;
(d) constructing pressures in the fine cells which are a combination of products of primal coarse cell pressures and basis functions augmented by the correction term from the $p_g$ equation; and
(e) outputting or displaying, through a computer system, the pressure in the fine cells for use as a variable in simulating the properties of the fluid-containing subterranean reservoir.

2. The method of claim 1 further comprising:
(f) constructing Neumann boundary conditions on the primal coarse cells utilizing the fine cell pressures from step (d);
(g) solving conventional pressure equations on the fine cells contained in each primal coarse cell with the Neumann boundary conditions applied at the boundaries of the primal coarse cell to arrive at improved fine cell pressures;
(h) solving transport equations for each phase in the fine cells utilizing the improved fine cell pressures of step (g) to arrive at fine cell saturations for each of the phases;
(i) calculating the mobility and mobility changes and pressure changes in each fine cell;
(j) if mobility changes and pressure changes are not within a predetermined tolerance, then repeat steps (b) to (i) until the tolerance is satisfied; and
(k) output the pressure and saturations in the fine cells and proceed to the next time step by repeating steps (b)-(j).

3. The method of claim 2, wherein step (b)(i) further comprises employing the dual basis functions and a correction function.

4. The method of claim 3, wherein the correction function is used to account for gravity effects and correct a coarse-scale operator.

5. The method of claim 1, wherein step (b)(i) further comprises employing the dual basis functions and a correction function.

6. The method of claim 5, wherein the correction function is used to account for gravity effects and correct a coarse-scale operator.

7. A method for simulating the properties of a fluid-containing subterranean reservoir, the method comprising:
(a) providing a reservoir model of a subterranean reservoir partitioned into a grid of fine cells and respective grids of primal coarse cells and dual coarse cells which overlie the grid of fine cells;
(b) computing an approximate fine-scale pressure field that accounts for gravity effects on fluid in the reservoir responsive to a solution of a coarse-scale pressure equation, the solution of the coarse-scale pressure equation including a gravity-capillary pressure component comprised of weighted primal coarse cell pressures and a correction function that accounts for buoyancy;
(c) construction of fine-scale fluxes;
(d) computing a phase-transport equation; and
(e) outputting or displaying, through a computer system, the phase-transport equation for use in simulating the properties of the fluid-containing subterranean reservoir.

8. The method of claim 7, wherein step (b) further comprises a juxtaposition of local solutions computed on the dual coarse cells.

9. The method of claim 7, wherein step (b) further comprises computing the approximate fine-scale pressure field responsive to a set of dual basis functions associated with the dual coarse grid such that the dual basis functions weight the primal coarse cell pressures.

10. The method of claim 9, wherein the primal coarse cell pressures are computed using an elliptic homogenous equation $p_h$, and the dual basis functions comprise local solutions to the elliptic homogenous equation.

11. The method of claim 9, wherein step (b) further comprises using the dual basis functions to:
(i) relate a coarse-scale pressure to a fine-scale pressure distribution; and
(ii) extract coarse-scale transmissibilities.

12. The method of claim 7, wherein the correction function is solved independent of the primal coarse cell pressures.

13. The method of claim 7, wherein the correction function accounts for the gravitational effects on the fluid in the reservoir and corrects a coarse-scale operator.

14. A computer-implemented method for use in modeling the properties of a fluid-containing subterranean reservoir, the method comprising:
(a) providing a reservoir model of a subterranean reservoir partitioned into a fine cell grid and respective primal and dual coarse cell grids that overlie the fine cell grid;
(b) constructing dual basis functions associated with the dual coarse grid by solving local elliptical problems;
(c) computing a transmissibility field associated with the primal coarse cell grid responsive to the dual basis functions;
(d) computing a gravity-capillary pressure associated with the dual coarse grid;
(e) computing a coarse-scale pressure associated with the primal coarse-scale grid responsive to the transmissibility field, the gravity-capillary pressure, and effects of at least one of sources, sinks and compressibility on accumulation; and
(f) outputting or displaying, through a computer system, the coarse-scale pressure associated with the primal coarse-scale grid.

15. The method of claim 14, wherein the gravity-capillary pressure associated with the dual coarse grid is comprised of weighted primal coarse cell pressures and a correction function that accounts for buoyancy.

16. The method of claim 15, wherein the dual basis functions weight the primal coarse cell pressures.

17. The method of claim 14, further comprising:
(g) computing a fine-scale pressure responsive to the coarse-scale pressure associated with the primal coarse-scale grid.

18. The method of claim 17, wherein the fine-scale pressure is associated with the dual coarse cell grid and is computed by:

interpolating the coarse scale pressure associated with the primal coarse-scale grid using the dual basis functions; and adding on a correction function that accounts for buoyancy.

19. The method of claim 17, wherein the fine-scale pressure is associated with the primal coarse cell grid and is computed by:

constructing Neumann boundary conditions associated with the primal coarse cell grid responsive to the coarse-scale pressure associated with the primal coarse-scale grid; and solving fine-scale pressure equations responsive to the Neumann boundary conditions.

20. The method of claim 19, further comprising:

(h) computing a fine-scale velocity field responsive to the fine-scale pressure associated with the primal coarse cell grid;

(i) computing a fine-scale saturation field by solving transport equations for each phase in the fine cell grid responsive to the fine-scale velocity field.

* * * * *